United States Patent
Ireland et al.

(10) Patent No.: US 12,297,132 B2
(45) Date of Patent: May 13, 2025

(54) PROCESS AND APPARATUS FOR NITRITATION USING MEMBRANE AERATED BIOFILM REACTOR

(71) Applicant: BL TECHNOLOGIES, INC., Minnetonka, MN (US)

(72) Inventors: John David Ireland, Oakville (CA); Zebo Long, Oakville (CA); Daniel Coutts, Milan (IT); Dwight Cornelius Houweling, Oakville (CA); Jeffrey Gerard Peeters, Oakville (CA); Moreno Di Pofi, Milan (IT); Sven Baumgarten, Ratingen (DE)

(73) Assignee: BL TECHNOLOGIES, INC., Minnetonka, MN (US)

( * ) Notice: Subject to any disclaimer, the term of this patent is extended or adjusted under 35 U.S.C. 154(b) by 285 days.

(21) Appl. No.: 17/798,386

(22) PCT Filed: Feb. 10, 2021

(86) PCT No.: PCT/US2021/017447
§ 371 (c)(1),
(2) Date: Aug. 9, 2022

(87) PCT Pub. No.: WO2021/163184
PCT Pub. Date: Aug. 19, 2021

(65) Prior Publication Data
US 2023/0079372 A1    Mar. 16, 2023

Related U.S. Application Data

(60) Provisional application No. 62/972,719, filed on Feb. 11, 2020.

(51) Int. Cl.
C02F 3/30     (2023.01)
C02F 3/10     (2023.01)

(52) U.S. Cl.
CPC .............. C02F 3/302 (2013.01); C02F 3/102 (2013.01); *C02F 2203/00* (2013.01); *C02F 2209/225* (2013.01); *C02F 2303/20* (2013.01)

(58) Field of Classification Search
CPC ...... C02F 3/1268; C02F 3/1273; C02F 3/302; C02F 3/102; C02F 2203/00; C02F 2209/225; C02F 2303/20
(Continued)

(56) References Cited

U.S. PATENT DOCUMENTS

| 5,078,884 A | 1/1992 | Mulder |
| 5,259,959 A | 11/1993 | Mulder |

(Continued)

FOREIGN PATENT DOCUMENTS

| CN | 107162177 A | 9/2017 |
| CN | 107428573 A | 12/2017 |

(Continued)

OTHER PUBLICATIONS

Ma et al, "Monitoring and modeling of nitrogen conversions in membrane-aerated biofilm reactors: effects of intermittent aeration", Technical University of Denmark, 2018, pp. 1-88 (Year: 2018).*

(Continued)

*Primary Examiner* — Claire A Norris

(57) ABSTRACT

This specification describes a membrane aerated biofilm reactor (MABR) and processes for nitritation, nitritation-denitritation or deammonification. The supply of oxygen through the gas-transfer membrane is limited to suppress the growth of nitrite oxidizing bacteria (NOB). Exhaust gas from an MABR unit may have an oxygen concentration of 4% or less. The process can optionally include one or more of: intermittent (batch) feed of process air; process air modulation; process air direction reversal; process air recycle; and, process air cascade flow. The process can (Continued)

optionally include adding a seed sludge containing anammox to a reactor, optionally after pre-treatment and selection. The process can optionally include pre-seeding an MABR media.

20 Claims, 13 Drawing Sheets

(58) Field of Classification Search
USPC .................................................. 210/630, 615
See application file for complete search history.

(56) References Cited

U.S. PATENT DOCUMENTS

| | | | |
|---|---|---|---|
| 5,997,736 | A | 12/1999 | Sumino et al. |
| 6,235,196 | B1 | 5/2001 | Zhou et al. |
| 6,383,390 | B1 | 5/2002 | Van Loosdrecht et al. |
| 6,540,920 | B2 | 4/2003 | Bounds et al. |
| 7,144,508 | B2 | 12/2006 | Isaka et al. |
| 7,267,764 | B2 | 9/2007 | Isaka et al. |
| 7,279,100 | B2 | 10/2007 | Devine |
| 7,314,563 | B2 | 1/2008 | Cho et al. |
| 7,329,341 | B2 | 2/2008 | Yamasaki et al. |
| 7,384,553 | B2 | 6/2008 | Isaka et al. |
| 7,410,584 | B2 | 8/2008 | Devine |
| 7,537,698 | B2 | 5/2009 | Sumino et al. |
| 7,556,961 | B2 | 7/2009 | Isaka et al. |
| 7,713,417 | B2 | 5/2010 | Sutton |
| 7,718,069 | B2 | 5/2010 | Laraway et al. |
| 7,754,081 | B2 | 7/2010 | Baba et al. |
| 7,846,334 | B2 | 12/2010 | Wett |
| 7,879,239 | B2 | 2/2011 | Baba et al. |
| 7,897,375 | B2 | 3/2011 | Isaka et al. |
| 7,972,513 | B2 | 7/2011 | Lee et al. |
| 8,057,673 | B2 | 11/2011 | Chang et al. |
| 8,173,419 | B2 | 5/2012 | Isaka et al. |
| 8,246,830 | B2 | 8/2012 | Takeda |
| 8,293,109 | B2 | 10/2012 | Kimura et al. |
| 12,122,698 | B2 | 10/2024 | Cote |
| 2003/0192825 | A1 | 10/2003 | Chang et al. |
| 2003/0203183 | A1 | 10/2003 | Hester et al. |
| 2004/0238441 | A1 | 12/2004 | Tanaka et al. |
| 2005/0255539 | A1 | 11/2005 | Isaka et al. |
| 2006/0124543 | A1 | 6/2006 | Pehrson et al. |
| 2006/0169636 | A1 | 8/2006 | Devine |
| 2006/0191847 | A1 | 8/2006 | Yamasaki et al. |
| 2007/0108125 | A1 | 5/2007 | Cho et al. |
| 2007/0218537 | A1 | 9/2007 | Furukawa et al. |
| 2007/0272610 | A1 | 11/2007 | Isaka et al. |
| 2008/0116130 | A1 | 5/2008 | Devine |
| 2008/0223783 | A1 | 9/2008 | Sutton |
| 2008/0245730 | A1 | 10/2008 | Tokutomi |
| 2009/0008314 | A1 | 1/2009 | Isaka et al. |
| 2009/0008315 | A1 | 1/2009 | Isaka et al. |
| 2009/0008326 | A1 | 1/2009 | Isaka et al. |
| 2009/0038999 | A1 | 2/2009 | Pehrson et al. |
| 2009/0039015 | A1 | 2/2009 | Baba et al. |
| 2009/0173692 | A1 | 7/2009 | Laraway et al. |
| 2010/0133179 | A1 | 6/2010 | Chang et al. |
| 2010/0219126 | A1 | 9/2010 | Baba et al. |
| 2010/0282654 | A1 | 11/2010 | Hauschild |
| 2011/0203992 | A1 | 8/2011 | Liu et al. |
| 2013/0264280 | A1 | 10/2013 | Zhao et al. |
| 2014/0037915 | A1 | 2/2014 | Rebouillat et al. |
| 2014/0091035 | A1 | 4/2014 | Regmi et al. |
| 2014/0238931 | A1 | 8/2014 | Dimassimo et al. |
| 2014/0263041 | A1 | 9/2014 | Regmi et al. |
| 2016/0002081 | A1 | 1/2016 | Cote |
| 2016/0009578 | A1 | 1/2016 | Cote et al. |
| 2016/0304369 | A1 | 10/2016 | Xin et al. |
| 2017/0291839 | A1 | 10/2017 | Christensson et al. |
| 2018/0009687 | A1 | 1/2018 | Murthy et al. |
| 2018/0022625 | A1 | 1/2018 | Cote et al. |

FOREIGN PATENT DOCUMENTS

| | | |
|---|---|---|
| CN | 107585865 A | 1/2018 |
| CN | 109205786 A | 1/2019 |
| EP | 1106237 B1 | 10/2004 |
| EP | 1595851 A1 | 11/2005 |
| EP | 1762547 A1 | 3/2007 |
| EP | 1780179 A1 | 5/2007 |
| EP | 1990318 A1 | 11/2008 |
| EP | 1695942 B1 | 5/2009 |
| EP | 1113997 B1 | 7/2009 |
| EP | 3549917 A1 | 10/2019 |
| JP | 07088477 A | 4/1995 |
| JP | 2005034739 A | 2/2005 |
| JP | 2006297374 A | 11/2006 |
| JP | 2007222830 A | 9/2007 |
| KR | 1020130060107 A | 6/2013 |
| WO | 2004018084 A1 | 3/2004 |
| WO | 2006058097 A1 | 6/2006 |
| WO | 2007055440 A1 | 5/2007 |
| WO | 2008115444 A2 | 9/2008 |
| WO | 2009049401 A1 | 4/2009 |
| WO | 2011106621 A2 | 9/2011 |
| WO | 2012019294 A1 | 2/2012 |
| WO | 2012019310 A1 | 2/2012 |
| WO | 2015142586 A2 | 9/2015 |
| WO | 2016209234 A1 | 12/2016 |
| WO | 2018136350 A1 | 7/2018 |
| WO | 2019216906 A1 | 11/2019 |
| WO | 2020005232 A1 | 1/2020 |
| WO | 2020086407 A2 | 4/2020 |

OTHER PUBLICATIONS

KWR Watercycle Research Institute, "DynaFil: Efficient Fermentation with Dynamic Filtration", undated, 1 page.
Mulder A. et al., "Anaerobic Ammonium Oxidation Discovered in a Denitrifying Fluidized Bed Reactor", FEMS Microbiology Ecology, 16:177-184, 1995.
International Patent Application No. PCT/US2019/057036, International Preliminary Report on Patentability, dated May 6, 2021.
International Patent Application No. PCT/US2019/057036, International Search Report and Written Opinion, dated Jan. 22, 2020.
Epps, Helen et al., "Pore Size and Air Permeability of Four Nonwoven Fabrics", International Nonwovens Journal, Mar. 14, 2002. 8 pages.
Gong, et al., "Feasibility of a Membrane-aerated Biofilm Reactor to Achieve Single-stage Autotrophic Nitrogen Removal Based on Anammox", Chemosphere, 2007, vol. 69(5), pp. 776-784.
Musabyimana, M., "Deammonification Process Kinetics and Inhibition Evaluation", Ph.D. Thesis, Virginia Polytechnic Institute, 2008. 169 pages.
Siegrist, H., et al., "Anammox Brings WWTP Closer to Energy Autarky due to Increased Biogas Production and Reduced Aeration Energy for N-Removal", Water Science & Technology, 57.3:383-388, 2008.
Syron, E. et al., "Membrane-Aerated Biofilms for High Rate Biotreatment: Performance Appraisal, Engineering Principles, Scale-up, and Development Requirements", Environmental Science and Technology, 42(6): 1833-1844, 2008.
Driessen, W., Abma, W., Van Zessen, E., Reitsma, G. and Haarhuis, R., "Sustainable Treatment of Reject Water and Industrial Effluent by Producing Valuable By-Products", 14th European Biosolids and Organic Resources Conference, 2009, 11 pages.
Sun, Sheng-Peng et al., "Start-up strategies of membrane-aerated biofilm reactor (MABR) for completely autotrophic nitrogen removal", Proceedings of the 2nd IWA Specialized Conference on Nutrient Management in Wastewater Treatment Processes, 2009, 9 pages.
Ma, Yunjie, "Monitoring and modeling of nitrogen conversions in membrane-aerated biofilm reactors: Effects of intermittent aeration", PhD Thesis, Department of Environmental Engineering, Technical University of Denmark, Jan. 2018, 88 pages.
Demooij, H.W. et al., "Ammoniacal Nitrogen Removal from Sludge Liquors—Operational Experience with the Demon Process", 15th European Biosolids and Organic Resources Conference, 2010. 12 pages.

(56) References Cited

OTHER PUBLICATIONS

Pellicer-Nacher, C. et al., "Sequential aeration of membrane aerated biofilm reactors for high-rate autotrophic nitrogen removal: experimental demonstration", Environ. Sci. Technol. 2010;44(19):7628-7634.
Joss, A. et al, "Combined Nitritation-Anammox: Advances in Understanding Process Stability", Environmental Science & Technology, 45:9735-9742, 2011.
KWR Watercycle Research Institute, "Dynamic Filtration (DynaFil) Efficient & sustainable water treatment", Jun. 21, 2011, 16 pages.
Mozumder, Salatul Islam, "Effect of heterotrophic growth on autotrophic nitrogen removal in a granular sludge reactor", Master's Thesis, Ghent University, 2011, 73 pages.
De Clippeleir, H., et al., "Mainstream Partial Nitritation / Anammox: Balancing overall Sustainability with Energy Savings", WEFTEC paper, 2012, 10 pages.
Hendrickx, Tim L.G., et al., "Autotrophic nitrogen removal from low strength waste water at low temperature", Water Research 46 (2012) 2187-2193.
Martin, K.J. et al., "The membrane biofilm reactor (MBfR) for water and wastewater treatment: Principles, applications, and recent developments", Bioresource Technology, vol. 122, Oct. 2012, pp. 83-94.
Wett, B., et al., "Development of Enhanced Deammonification Selector" WEFTEC paper, 2012. 9 pages.
Bunce, R.W., et al., "Modification of a B-Stage MLE to Take Advantage of SND and Nitrite Shunt in an A/B Process Pilot Study", WEF Nutrient Conference, 2013. 19 pages.
Gilmore, K.R. et al, "Autotrophic Nitrogen Removal in a Membrane-Aerated Biofilm Reactor Under Continuous Aeration: A Demonstration" Environmental Engineering Science, 30(1), 38-45, 2013.
Stinson, B., et al., "Roadmap Toward Energy-neutrality & Chemical Optimization at Enhanced Nutrient Removal Facilities", WEF Nutrient Conference, Vancouver, 2013.
Bluetech Research, "The Promise of Advanced Biological Nitrogen Removal via Deammonification: A Critical Step Towards Net Energy Positive Wastewater Conversion", Webinar, Jul. 10, 2014, 108 pages.
Gilbert, E.M., et al., "Response of Different Nitrospira Species to Anoxic Periods Depends on Opertional DO", Environmental Science & Technology, 48:2934-2941, 2014.
Lackner, S. et al., "Full-Scale Partial Nitritation/Anammox Experiences—an Application Survey", Water Research 55:292-303, 2014.
Meng, Fangang et al., "Improving Nitrogen Removal in an Anammox Reactor Using a Permeable Reactive Biobarrier", Water Research, 2014, 1-46.
Regmi, P. et al., "Control of Aeration, Aerobic SRT and COD Input for Mainstream Nitritation/Denitritation", Water Research, vol. 57, Jun. 15, 2014, pp. 162-171.
Delgado Vela, J. et al., "Prospects for Biological Nitrogen Removal from Anaerobic Effluents During Mainstream Wastewater Treatment", Environ. Sci. Technol. Lett., 2, 234-244, 2015.
Ding, Zhiji, "Engineering and microbial aspects of Anammox process in wastewater treatment", PhD Thesis, University of Paris-Est, 2015, 169 pages.
Li, Xiaojin et al. "Nitrogen removal by granular nitritationeanammox in an upflow membrane-aerated biofilm reactor", Water Research 94 (2016) 23-31.

Li, X. et al., "Status, Challenges, and Perspectives of Mainstream Nitritation-Anammox for Wastewater Treatment" Water Environment Research, 634-649, Jul. 2018.
Chinese Patent Application No. CN201980069894.0, Office Action dated Sep. 13, 2022.
Chinese Patent Application No. CN201980069894.0, Office Action dated Apr. 25, 2023.
European Patent Application No. 19812877.9, Office Action dated Aug. 30, 2023.
KWR Watercycle Research Institute, "DynaFil: Efficient Fermentation with Dynamic Filtration", undated, 1 page. Have.
Philippine Patent Application No. 1/2021/550851, Office Action dated Oct. 15, 2024.
Chinese Patent Application No. CN201980069894.0, Office Action dated Sep. 27, 2023.
Australian Patent Application No. AU2019366302, Office Action dated Sep. 19, 2024.
International Patent Application No. PCT/US2021/017447, International Search Report and Written Opinion, dated Jul. 17, 2021.
International Patent Application No. PCT/US2021/017447, International Preliminary Report on Patentability, dated Aug. 11, 2022.
Lackner, Susanne et al., "Nitration performance in membrane-aerated biofilm reactors differs from conventional biofilm systems", Water Research, vol. 44, No. 20, Dec. 1, 2010, pp. 6073-6084.
Bunce, R.W., et al., "Modification of a B-Stage MLE to Take Advantage of SND and Nitrite Shunt in an A/B Process Pilot Study", WEF Nutrient Conference, 2013.
Demooij, H.W. et al., "Ammoniacal Nitrogen Removal from Sludge Liquors—Operational Experience with the DEMON Process", 15th European Biosolids and Organic Resources Conference, 2010.
Musabyimana, M., "Deammonification Process Kinetics and Inhibition Evaluation", Ph.D. Thesis, Virginia Polytechnic Institute, 2008.
Wett, B., et al., "Development of Enhanced Deammonification Selector" WEFTEC paper, 2012.
Augusto, M.R. et al., "Fast start-up of the single-stage nitrogen removal using anammox and partial nitritation (SNAP) from conventional activated sludge in a membrane-aerated biofilm reactor", Bioresource Technology 266 (2018) 151-157.
Lin, J., et al., "Nitrogen removal performances of a polyvinylidene fluoride membrane-aerated biofilm reactor", International Biodeterioration & Biodegradation 102 (2015) 49-55.
Li, Xiaojin et al. "Nitrogen removal by granular nitritation-anammox in an upflow membrane-aerated biofilm reactor", Water Research 94 (2016) 23-31.
Epps, Helen et al., "Pore Size and Air Permeability of Four Nonwoven Fabrics", International Nonwovens Journal, Mar. 14, 2007. 8 pages.
Ma, Y., et al., "Intermittent Aeration Suppresses Nitrite-Oxidizing Bacteria in Membrane-Aerated Biofilms: A Model-Based Explanation", Environmental Science and Technology, 51(11), 6146-6155. 2017.
International Patent Application No. PCT/US2021/017447, International Search Report and Written Opinion, dated Jul. 19, 2021.
Lackner, S. et al, "Nitritation performance in membrane-aerated biofilm reactors differs from conventional biofilm systems", Water Research 44 (2010) 6073-6084.
International Patent Application No. PCT/US2021/017447, International Preliminary Report on Patentability, dated Aug. 25, 2022.
Singapore Patent Application No. 11202251838G Written Opinion and Search Report dated Dec. 19, 2024.

\* cited by examiner

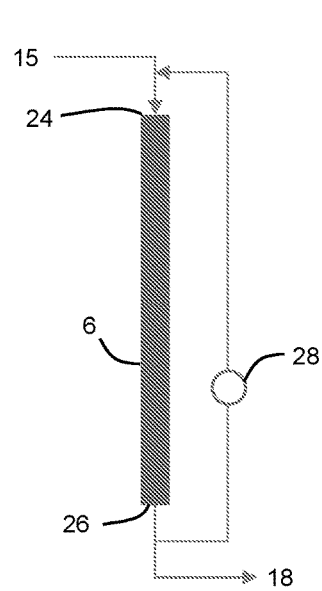
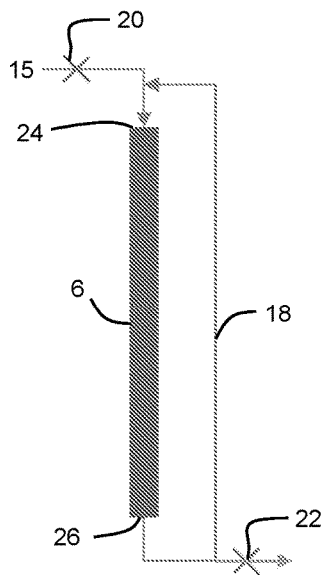
FIGURE 9A   FIGURE 9B
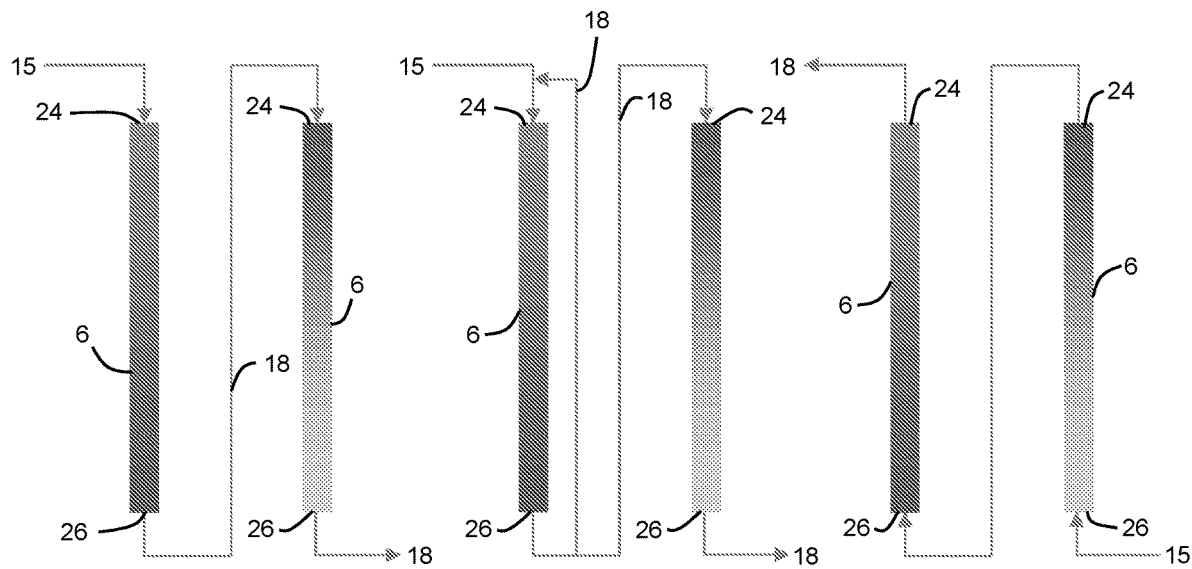
FIGURE 10A   FIGURE 10B   FIGURE 10C

PROCESS AND APPARATUS FOR NITRITATION USING MEMBRANE AERATED BIOFILM REACTOR

RELATED APPLICATIONS

This application is a National Stage Entry of International Application No. PCT/US2021/017447, filed Feb. 10, 2021, which claims the benefit of, and priority to, U.S. Provisional Patent Application No. 62/972,719, Process and Apparatus for Nitritation Using Membrane Aerated Biofilm Reactor, filed on Feb. 11, 2020, which is incorporated herein by reference.

FIELD

This specification relates to membrane aerated biofilm reactors (MABR) and related apparatus and to wastewater treatment using a membrane aerated biofilm.

BACKGROUND

Nitrogen compounds, often in the form of ammonia, is conventionally removed from wastewater by nitrification-denitrification. Conventional nitrification involves two steps: nitritation by ammonia oxidizing bacteria (AOB) to produce nitrite followed by the oxidation of nitrite to nitrate by nitrite oxidizing bacteria (NOB). Nitritation, alternatively called partial nitrification, proceeds through only the first step using AOB to produce nitrite. In nitritation-denitritation, alternatively called short-cut denitrification, the nitrite is converted directly to gaseous nitrogen by ordinary heterotrophic bacteria (OHB) without producing nitrate. Anammox is an abbreviation for anaerobic ammonium oxidation, a microbial process in which nitrite and ammonium are converted into diatomic nitrogen and water. The abbreviation may also be used to refer to bacteria that perform the anammox process. Some nitrate is also produced as a respiration product of the anammox bacteria. Deammonification (alternatively called partial nitrification—anammox ammonia oxidation) refers to a process including partial nitritation (i.e. nitritation of some but not all of the ammonium in a wastewater supply without significant production of nitrate) combined with anaerobic ammonium oxidation of the nitrite and remaining ammonium. Nitritation-denitritation and deammonification are difficult processes to achieve in practice because NOB grow easily and tend to convert these processes to full nitrification-denitrification.

In membrane biofilm reactors (MBfR), a gas transfer membrane is used to support a biofilm while one or more gasses are supplied to the biofilm through the membrane. Membrane-aerated biofilm reactors (MABR) are a subset of MBfR where an oxygen containing gas, typically air, is used in the bio-reaction. Efforts to use MABR for deammonification were recently reviewed by Li et al (2018). Efforts to address the challenge of suppressing NOB in the biofilm include controlling air pressure inside the membrane in an effort to match the ammonia and oxygen transfer rates (Gilmore et. al., 2013) and by periodically turning off the air (or oxygen) supply, for example turning the air off for 1 day out of a 1.5 day cycle. (Pellicer-Nacher 2010).

INTRODUCTION TO THE INVENTION

The following paragraphs are intended to introduce the reader to the invention and the detailed description to follow and not to limit or define any claimed invention.

The inventors have observed that methods of controlling NOB as described above are not efficient in practice. For example, controlling air pressure or air flow rate can avoid a significant growth of NOB in a biofilm during a reactor start up period (which may take a few months) and for several months thereafter. However, a significant population of NOB eventually appears and converts the process to full nitrification-denitrification. The reactor must then be shut down, usually for a period of 4-8 weeks, to destroy the NOB population in the biofilm. But after re-starting the reactor, the NOB population typically returns a few months later causing another reactor shut down. Shutting down the reactor for several weeks multiple times a year severely impacts the productivity of the process. Similarly, turning air off for 12-24 hours out of a 1.5-2 day cycle severely impacts the productivity of the process. While the air off periods can inhibit the growth of NOB, the AOB also do not convert ammonia to nitrite during the air off periods.

This specification describes processes for operating an MABR. The MABR may be used for the biological conversion of ammonia in water, for example through nitritation (without full nitrification) with or without a complete nitritation-denitritation or deammonification reaction. In these processes, it is useful to suppress or control the growth of NOB and, in the case of deammonification, to support the growth of anammox bacteria. A process includes providing a gas or gas mixture containing oxygen (optionally called process air) to an apparatus containing a membrane aerated biofilm media such as a gas transfer membrane (the apparatus optionally called an MABR unit) so as to inhibit the growth of NOB and, in some examples, to encourage the growth of anammox. This specification also describes an apparatus, for example an MABR or MABR unit. The apparatus includes means, for example one or more of conduit networks, gages, valves, sensors and flow control devices, for providing air to a membrane aerated biofilm media as required to implement a process.

In some examples described herein, a process can include one or more of: intermittent or batch feed of process air in short cycles; process air modulation; process air direction reversal; process air nitrogen enrichment (alternatively called process air oxygen dilution), for example by process air recycle; process air cascade flow; and, maintaining an exhaust air oxygen concentration below 4%. Process air is air provided to the inside of an MABR unit for transfer to a biofilm as opposed to air provided, for example, to produce bubbles outside of the MABR unit to scour a biofilm. Exhaust air is the portion of process air that is not delivered to the biofilm and leaves an MABR unit. These processes may be used together in various permutations and combinations. For example, process air cascade flow may be combined with any other method, optionally in combination with an MABR media (i.e. one or more gas transfer membranes) or MABR unit that is less than 0.5 m long. In another example, process airflow direction reversal can be combined with any of the other methods.

This specification describes a process of batch feed of process air in short cycles. In this process, air is provided to an MABR unit for a first period of time and then valves are closed upstream and downstream of the MABR unit for a second period of time. Optionally the total cycle time may be between 0.1 and 2 hours long.

This specification describes a process of process air modulation. In this process, air is provided to an MABR unit at a first rate for a first period of time and at a second rate for a second period of time. Optionally the total cycle time may be between 0.5 and 10 days long.

This specification describes a process of process air direction reversal. In this process, process air flows in one direction through an MABR unit for a first period of time, and then flows in the opposite direction through the MABR unit for a second period of time. Optionally, the total cycle time may be between 0.5 and 10 days long.

The specification describes a process of process air nitrogen enrichment. In process air nitrogen enrichment, nitrogen enriched (or oxygen diluted) air is provided to an MABR for a period of time. The nitrogen enriched air may be provided continuously. Optionally, the nitrogen enriched air is provided to the MABR unit for a first period of time and ambient air is provided to the MABR unit for a second period of time, for example with a total cycle time between 0.5 and 10 days long. In some examples, the nitrogen enriched air is provided by process air recycle, i.e. flowing at least some of the exhaust gas from an outlet of an MABR unit into an inlet of the MABR unit. Optionally, the process air flow rate in the second period of time is not reduced relative to the first period of time such that the flow rate of air through the MABR unit increase during the period of exhaust gas recycle.

This specification describes a process of process air cascade flow. In some examples, process air is provided to multiple MABR units in series, for example by connecting a port of one MABR unit to a port of another MABR unit.

A short startup period also benefits the use of deammonification to treat water since anammox are slow growing microorganisms of low yields, and the start-up time of a deammonification reactor is typically significant. In some examples, this specification describes a process useful for shortening the start-up time of a reactor or for shortening the time required for a reactor to recover from an upset involving loss of anammox bacteria. The process can include adding a seed sludge containing anammox to a reactor, optionally after pre-treatment and selection of the seed sludge, optionally after seeding the reactor with a nitrifying sludge. Alternatively or additionally, the process can include pre-seeding the MABR media or unit separately from seeding the reactor.

Without intending to be limited by theory, the methods described herein stress NOB by causing at least some, but preferably most or all, of the biofilm attached to an MABR unit to periodically experience low oxygen availability. However, the MABR unit as a whole is rarely, if ever, entirely exposed to low oxygen availability so the AOB remain active. In some examples, the process takes advantage of spatial differences in the MABR unit, for example that upstream parts of the MABR unit receive process air with a higher oxygen concentration than downstream parts of the MABR unit. Processes such as process air cascade flow, process air batch feed, process air modulation, and process air nitrogen enrichment can help ensure that a downstream part of the MABR unit is at least temporarily exposed to air with a low oxygen concentration, for example 4% oxygen or less. Process air direction reversal or exhaust gas recycle can cause the area of low oxygen concentration to move to the formerly upstream end of the MABR unit such that the NOB are inhibited throughout most or all of the biofilm.

BRIEF DESCRIPTION OF THE FIGURES

FIGS. 9A and 9B are diagrams of process air recycle with continuous process air with recycle and batch feed of pure oxygen with recycle on the right.

FIGS. 10A, 10B and 10C are diagrams of process air cascade flow, process air cascade flow with recycle, and process air cascade flow with process air direction reversal respectively.

DETAILED DESCRIPTION

A membrane aerated biofilm media (optionally called MABR media) typically includes one or more gas transfer membranes. Gas transfer membranes can be hydrophobic porous membranes, a dense walled material or a material with pores small enough (i.e. <40 Angstroms) to prevent bulk water flow. The gas transfer membranes can have any form factor. For example, the gas transfer membranes can be in the form of a flat sheet, for example as in products made by Fluence, or in the form of discrete hollow fibres, for example as in products made by 3M or Oxymem. Alternatively, the gas transfer membranes may be a plurality of hollow fiber gas transfer membranes in a cord as in the ZeeLung™ product sold by Suez. Such a cord is described in International Publication Number WO 2015/142,586 A2, which is incorporated herein by reference. In the case of a cord, or another structure with multiple gas transfer membranes smaller than the expected biofilm thickness, the gas transfer surface can be represented by a smooth surface covering the individual membranes. The use of a cord to support nitritation is described in International Publication Number WO 2020/086,407 A2, which is incorporated herein by reference. The MABR media can be deployed in a tank with or without suspended biomass. Nitritation, nitritation-denitritation, or deammonification can occur in the biofilm.

Factors that inhibit or wash out NOB include, for example, solids retention time (SRT), dissolved oxygen (DO) concentration (especially during different lag phases of AOBs and NOBs), temperature, pH, alkalinity, free nitrous acid and free ammonia. However, many of these factors are either impractical or difficult to adjust in an MABR. Limiting oxygen supply may be used for NOB control in an MABR. However, an overly limited oxygen supply will also reduce the ability of AOB's to convert ammonia to nitrite. Further, limiting oxygen supply alone is not typically effective to achieve and maintain high-rate nitritation while minimizing complete nitrification in an MABR for an extended period of time.

In a membrane aerated biofilm process, oxygen diffuses across the membrane wall into the biofilm while substrates, such as ammonium, come into the biofilm from the bulk liquid in the opposite direction, a phenomenon called counter-diffusion. Oxygen accumulates at the base of the biofilm if the oxygen is not consumed immediately. When the local oxygen level becomes high enough, NOB start to grow and may proliferate at the base of the biofilm. It is a dilemma in MABR that a higher airflow rate might increase the oxygen transfer rate (OTR) but it might also cause more oxygen accumulation at the base of the biofilm. Even with a controlled, low air flow rate, after a long period of operation a substantial population of NOB may become established in the biofilm.

Figure 1:
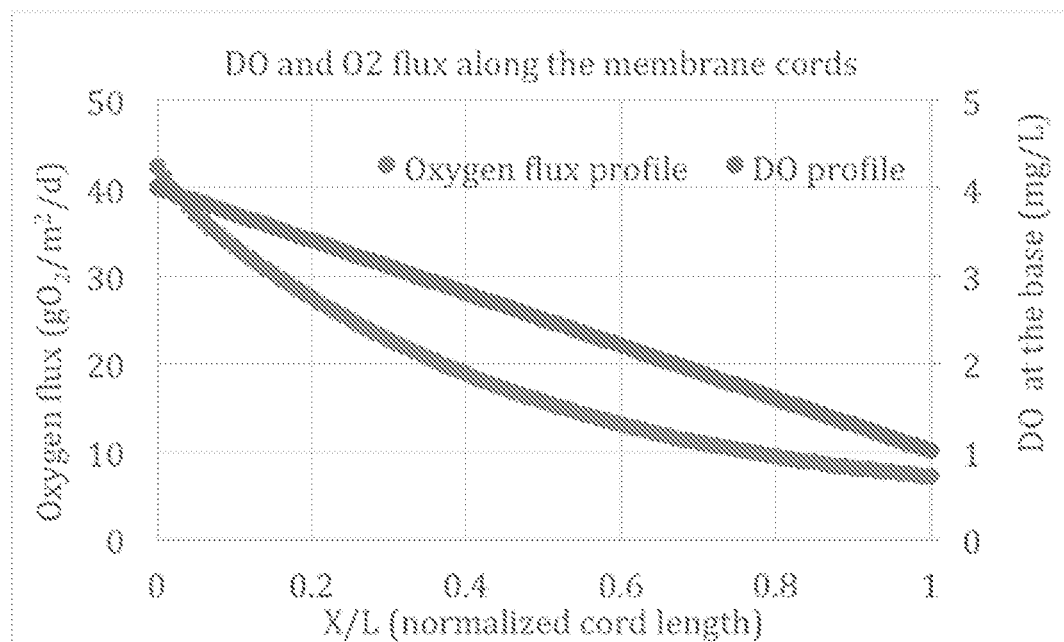
FIG. 1 is a graph of DO and $O_2$ flux along membrane cords in a pilot plant.

In particular, even with a low airflow rate, NOB might proliferate near the entrance of an MABR unit. The oxygen concentration of process air, and therefore the oxygen transfer driving force, is higher at the entrance of an MABR unit. FIG. 1, shows the oxygen flux and DO concentration at the base of the biofilm along the length of a hollow fiber gas transfer membrane. As can be seen from FIG. 1, the oxygen flux and DO concentration are higher near the entrance of the MABR unit (i.e. at the entrance to the gas transfer membrane) and became lower at the exit. Although the overall process conditions (i.e. the average oxygen flux or DO concentration) may be optimized to selected for NOB suppression, the oxygen flux and DO concentration near the entrance of the MABR unit are still high, which might result in NOB growth in the long term starting from one end of the membrane. However, some or all of the processes described below help to suppress NOB growth in the long term and minimally reduce, or may optionally increase, the overall oxygen transfer rate (OTR).

Figure 2:
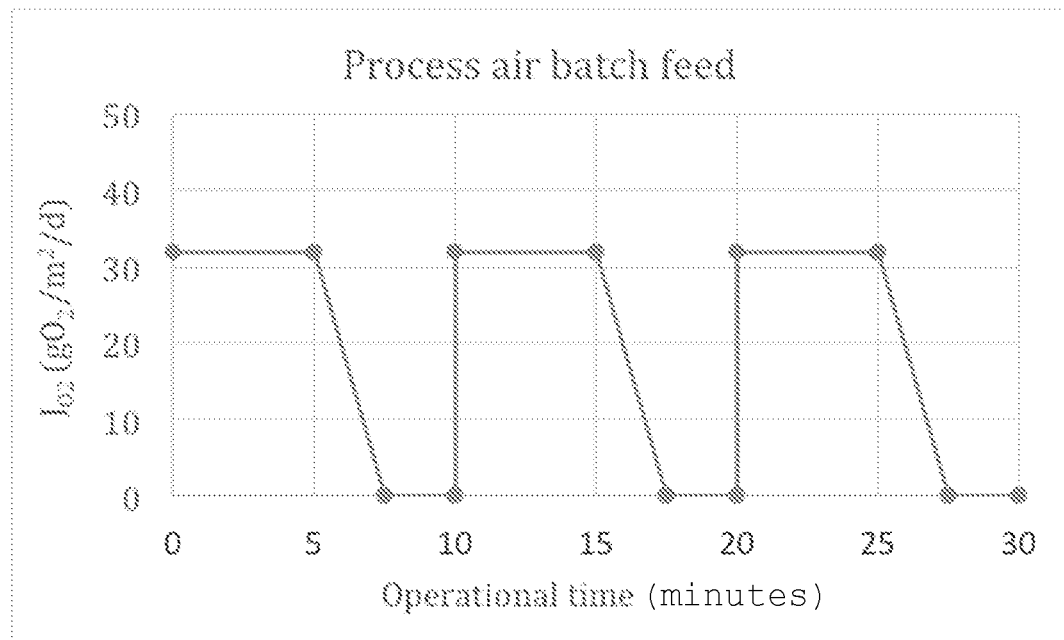
FIG. 2 is a graph of oxygen flux change in the batch feed of process air at a frequency.

An intermittent or batch feed of process air, for example over a time period of 0.1 to 2 hours, creates a cycle of OTR change over time in the biofilm, including a period of high OTR (aeration-on period), a period of OTR decreasing to zero (aeration-transition period), and optionally a short period of OTR maintained at zero (aeration-off period). An example of the change in oxygen flow through the membrane is shown in FIG. 2. The durations of the aeration on and off periods are the controllable parameters for the process success and can be optimized for a particular plant. In general, the duration of the aeration-off period should be 25% or less, or 10% or less, of the total cycle time. The total duration of the cycle is optionally 30 minutes or less. The process air conditions during the aeration-on period, including process airflow rate and operational pressure, can be higher than for a process with continuous process air selected to inhibit NOB. In this way, the overall OTR and the treatment capacity of an MABR unit with batch feed of process air is not necessarily reduced relative to a process with continuous process air.

Figure 6A:
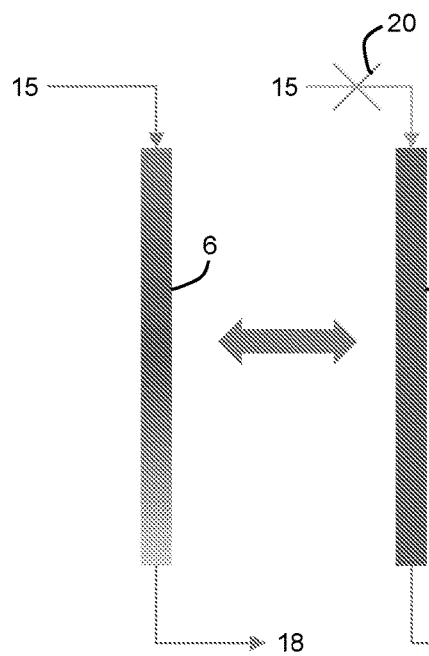
FIGS. 6A and 6B are diagrams of batch feed of process air with open ended media and dead ended media respectively.
Figure 6B:
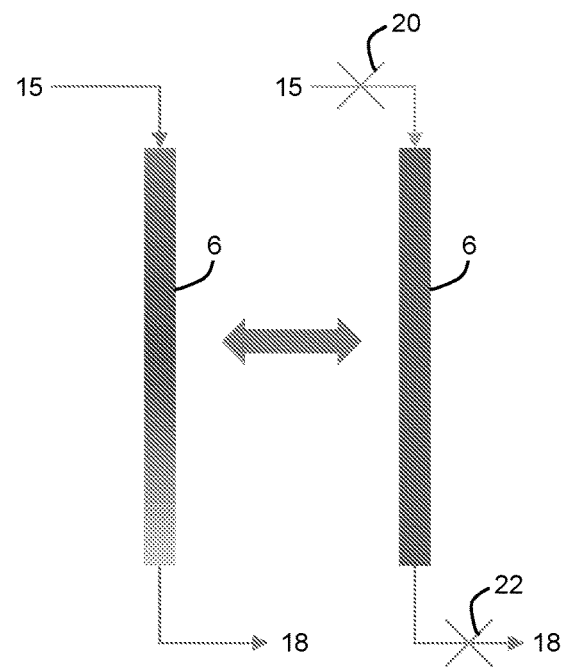

FIGS. 6A and 6B shows two methods of providing the aeration-transition period. In one method, shown in FIG. 6A, the supply of process air 15 to the MABR unit 6 is stopped, for example by closing inlet valve 20, while an exhaust 18 outlet from the MABR unit is left open. In another method, shown in FIG. 6B, the supply of process air 15 to the MABR unit 6 is stopped, for example by closing an inlet valve 20, and an exhaust outlet from the MABR unit is also closed, for example by closing an exhaust valve 22. The naming of the inlet and outlet of the MABR unit 6 is relative to the direction of process air flowing through the MABR unit 6, which may be changed as described further below. However, the inlet and outlet are on opposite ends of gas transfer membranes in the MABR unit 6. Accordingly, when the inlet valve 20 and exhaust valve 22 are closed, process air is trapped inside the MABR unit and the oxygen continues to permeate through the gas transfer membranes to the biofilm. Within a short cycle, the resulting aeration-transition period can continue to the next aeration-on period such that there is no aeration-off period. In the arrangement of FIG. 6A, there is often a pressure control valve at the outlet of an MABR unit 6. This valve can be modulated to extend the aeration-transition period such that any aeration-off period is less than 25%, optionally less than 10%, of the total cycle time. However, in either case (FIG. 6A or 6B) the total cycle time may be 2 hours or less, or 30 minutes or less, since in a longer cycle the aeration-transition period is not likely to be a material part of the cycle. The aeration-transition period, and the aeration-off period if any, inhibit the growth of NOB.

Figure 3:
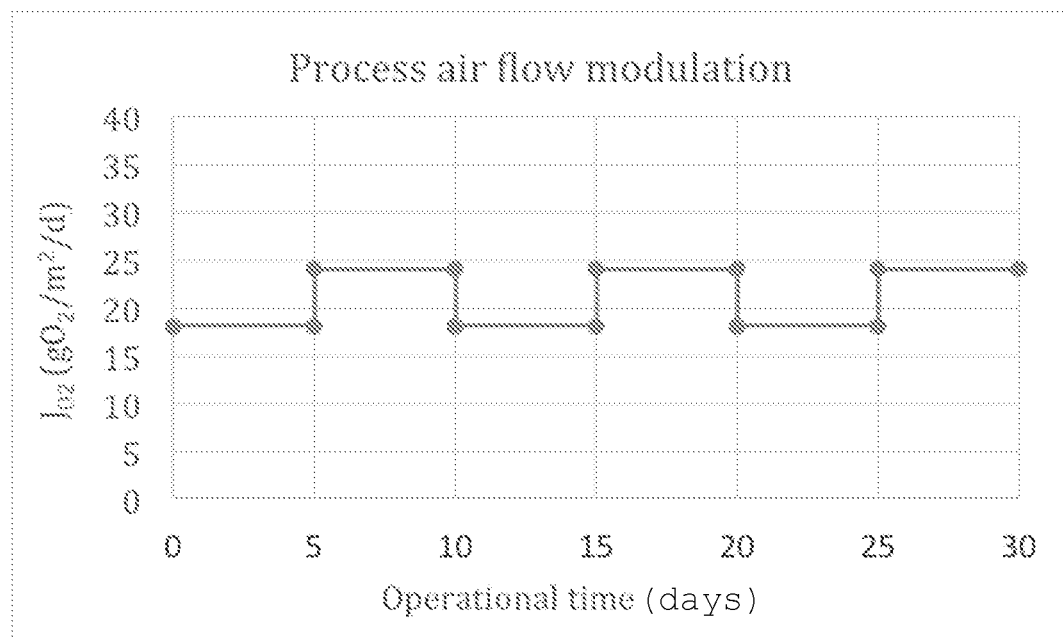
FIG. 3 is a graph of oxygen flux over time in a process air modulation process.
Figure 7:
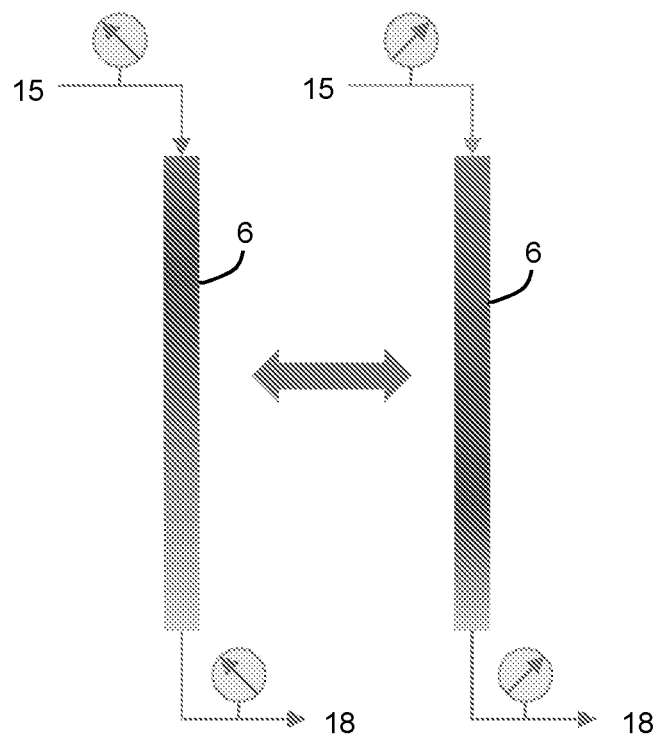
FIG. 7 is a diagram of process air modulation with continuous but low process air flow on the left and intermittent but high process air flow on the right

FIGS. 3 and 7 show process air modulation. Process air modulation is conducted over longer cycles, for example cycles between 0.5 and 10 days long, or between 1 and 7 days long. Process air modulation does not have an aeration-off period. As shown in FIG. 3, the process air flow rate is modulated between a relatively higher rate and a relatively lower rate in repeated cycles. As shown in FIG. 7, the high flow rate periods typically correspond with a higher pressure inside the MABR unit 6 (right side of FIG. 7) compared to the pressure inside the MABR unit 6 during the low flow rate periods (left side of FIG. 7). The lower OTR period in process air modulation is controlled at a level that NOB is inhibited, i.e. at a level that limits the growth of NOB, optionally temporarily stopping or reversing the growth of NOB, in at least part of the MABR unit 6. The higher OTR periods increase the average OTR without causing an over-proliferation of NOB. Optionally, process air modulation can be combined with batch feed of process air to produce a process having periods of high OTR, periods of low OTR, aeration-transitions periods and aeration-off periods. Optionally, process air modulation is combined with process air direction reversal (described below). In this case, the lower flow rate may be selected such that NOB are inhibited only in a downstream end of the MABR unit 6.

The threshold for a low OTR that limits NOB growth is a function of many parameters, including the membrane material and configuration, and operational conditions, such as temperature, pH, DO and ammonium concentration in the bulk. The accepted level of complete nitrification also impacts the selected threshold of OTR. Therefore, the operational conditions to achieve a low OTR may vary according to the changes of the affecting parameters. However, the inventors have observed that NOB may be inhibited in at least part of an MABR unit when the exhaust gas has an oxygen concentration of 4% or less. NOB are very likely to be inhibited in at least a downstream part of an MABR when the exhaust gas has an oxygen concentration of 2% or less.

Figure 8:
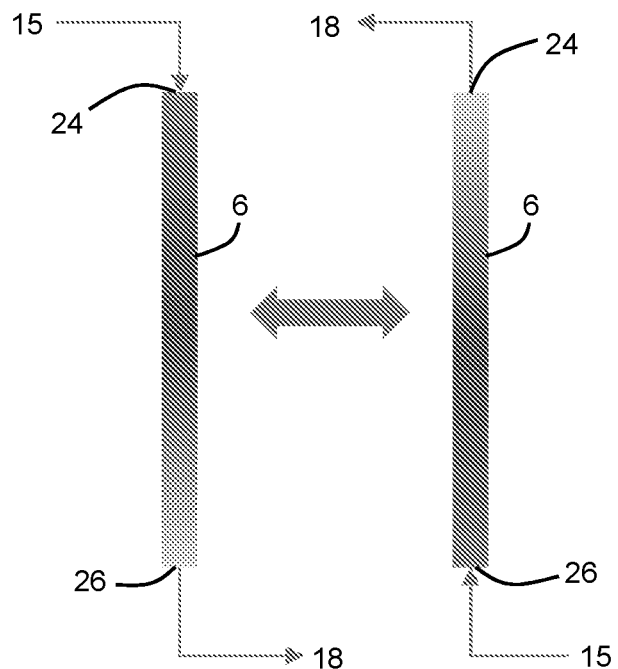
FIG. 8 is a diagram of process airflow direction reversal.

Referring to FIG. 8, in process air direction reversal, in a first period of time process air 15 enters a first port 24 of an MABR unit 6 and exhaust gas 18 leaves from a second port 26 of the MABR unit 6 (left side of FIG. 8). In a second period of time (right side of FIG. 8) process air 15 enters the second port 26 of the MABR unit 6 and exhaust gas 18 leaves from the first port 24 of the MABR unit 6. The air flow direction through the membrane aerated biofilm media (i.e. hollow fiber membranes or cords) is reversed in repeated cycles.

As discussed above, a stable nitritation can be achieved under continuous but relatively low process airflow rate. However, a compromise is often made with continuous aeration in that a certain level of complete nitrification may be allowed to maximize the OTR (and the conversion of ammonia to nitrite) while keeping NOB only partially under control. The complete nitrification might mainly take place in the biofilm near the upstream end of an MABR unit 6, where process air 15 is introduced into the membrane aerated biofilm media, a phenomenon called 'entrance effect' hereafter. The entrance effect occurs because the oxygen flux is higher at the entrance and becomes lower at the exit of the MABR unit 6 as the oxygen partial pressure decreases along the gas flow direction in the MABR unit 6.

Figure 4:
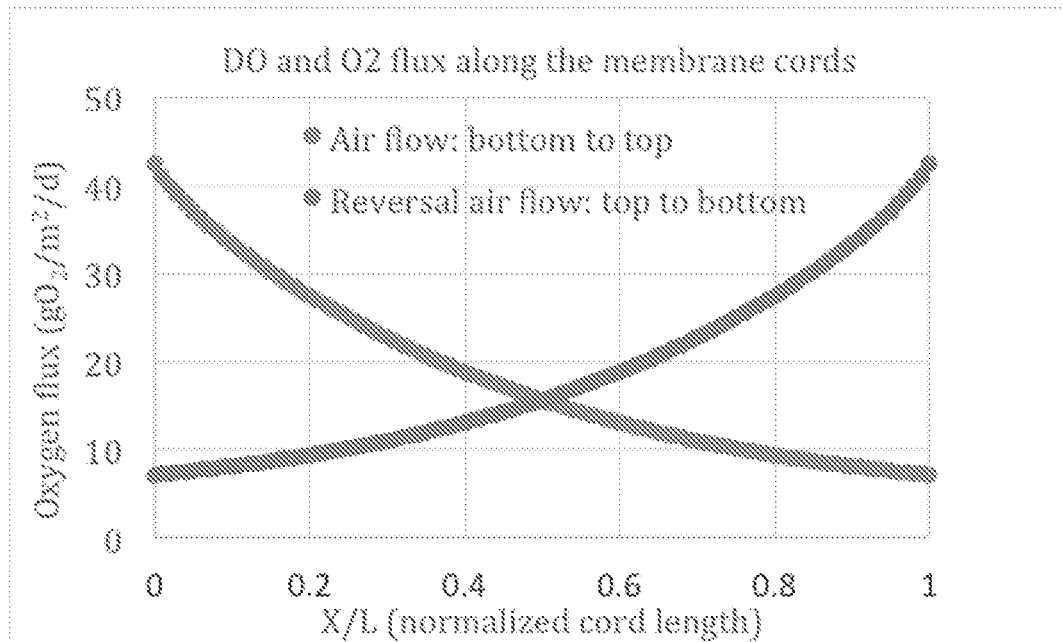
FIG. 4 is a graph of oxygen flux profile along the membrane length in process airflow direction reversal.

As shown in FIG. 4, the oxygen flux profile along the length of a gas transfer membrane is switched when the process airflow direction is reversed. The biofilm at both ends of the membrane only receives a relatively high oxygen flux intermittently, and this is followed by a period of relatively low oxygen flux. NOB populations do not become established at either end of the membrane if the periods of low oxygen flux are long enough to damage any NOB that may have started to grow in the biofilm during the period of high oxygen flux. The frequency of the reversal operation may vary between plants but generally should not exceed 20 days between reversals. Optionally, the total process time (i.e. the sum of the first period of time and the second period of time) is in the range of 0.5 to 10 days or 1-7 days. The overall process air conditions may also be selected to increase OTR relative to a process with continuous process air. To implement process air direction reversal, an appropriate network of valves and pipes may be connected to the MABR unit 6 and a controller to provide an automated reversal of flow through the membranes.

Process air direction reversal may be more effective when there is a large gradient in OTR along the length of the media, for example due to a variation in oxygen concentration along the length of a membrane. A large partial pressure difference along the length of a membrane creates a non-uniform DO profile in the attached biofilm along the length of the membrane. With process air direction reversal, the areas near the upstream and downstream ends of an MABR unit 6 have a non-uniform DO profile over time. The temporary presence of very low DO is manageable for AOB, but detrimental to NOB. However, a large portion of the biofilm has a higher DO, with active AOB, at all times in the process. A non-uniform DO profile within the biofilm along the length of a membrane, combined with process air direction reversal, helps to inhibit NOB growth in a critical part of the biofilm near the inlet of an MABR unit 6 without reducing activity within the MABR unit 6 as a whole.

The concentration of oxygen in exhaust gas 18 can be used as an indicator of whether there is a materially non-uniform DO profile along the length of the biofilm. For example, the oxygen concentration in the exhaust gas may be 0.5-4% or less, or 0.5-2% or less, optionally about 1-2%. In an automated process, a sensor can be used to measure the oxygen concentration in the exhaust gas 18. A control process may use an exhaust gas oxygen concentration set point, for example in range of 1-2%, to control the flow rate and/or pressure of the process air 15. Automating the process air flow based on the exhaust gas oxygen concentration helps to provide a stable and reliable process.

The entrance effect can also be mitigated by temporary or continuous process air nitrogen enrichment. The process air is relatively nitrogen rich, or oxygen diluted, relative to ambient air. For example, the oxygen concentration in the process air may be in the rang of 5-15% at the inlet to a MABR unit. Nitrogen enriched process air can be provided, for example, by flowing the process air through a gas exchange membrane unit or by adding nitrogen to the process air. Optionally, process air nitrogen enrichment can be provided by exhaust gas recycle. The exhaust gas is depleted in oxygen, or nitrogen enriched. FIG. 9A shows one method of process air recycle. In this method, some of the exhaust gas 18 is continuously mixed with fresh process air 15. A nitrogen enriched mixture of fresh process air 15 and exhaust gas 18 flows through the MABR unit 6. FIG. 9B shows another method of process air recycle. In this method, a batch of process air 15 is pumped into the MABR unit 6. Inlet valve 20 and exhaust valve 22 are closed and the exhaust gas 18 is recycled through the MABR unit 6 for a period of time, optionally with some process air 15 added to make up in volume for oxygen permeating out of the MABR unit 6. After a period of time, a new batch of fresh process air 15 is added. The method of FIG. 9A produces a continuous supply of nitrogen enriched process air, at a generally constant nitrogen concentration, for the duration of the process air nitrogen enrichment. The method of FIG. 9B produces process air with an increasing concentration of nitrogen over the duration of the process air nitrogen enrichment. Optionally, process air nitrogen enrichment can be provided for a first period time and then withdrawn for a second period of time in repeated cycles, for example of 0.5-10 days or 1-7 days.

Figure 5:
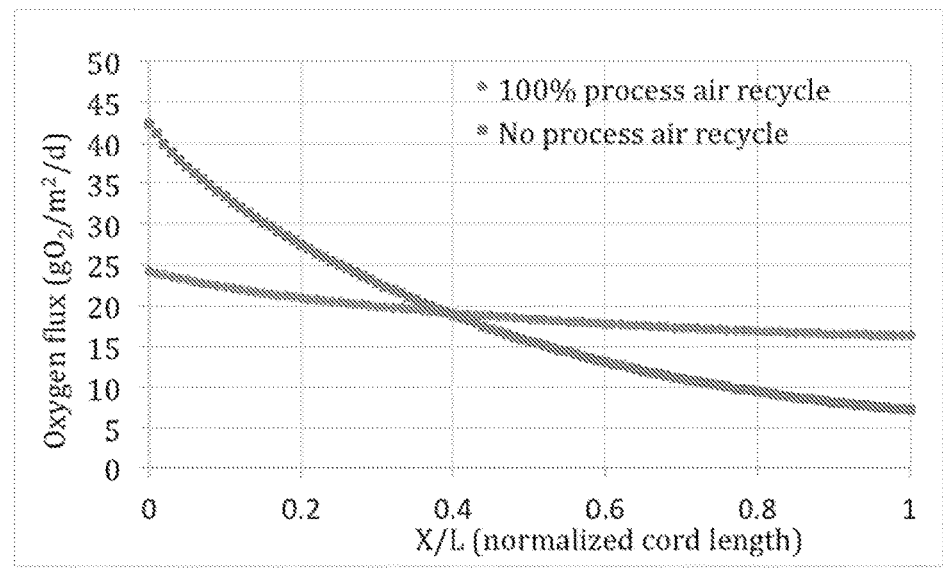
FIG. 5 is a graph of oxygen flux along the membrane length with and without process air recycle.

FIG. 5 shows a comparison of the oxygen flux along the membrane length with and without process air nitrogen enrichment. In this example, the flow of fresh process air is not reduced when nitrogen or recycled exhaust gas is added. In this way the total mass flow rate through the MABR unit increases but the oxygen mass transfer flow rate does not increase, or does not increase to the same extent. When the process air is recycled (or diluted with nitrogen), oxygen partial pressure at the entrance of a membrane becomes lower and, if the mass flow rate is increased, the gas velocity becomes higher in the membrane. This results in lower oxygen flux at the entrance of the membrane and more evenly distributed oxygen flux along the membrane length. The overall OTR rate may be retained while inhibiting the growth of NOB at the upstream end of the membranes.

Process air recycle can be implemented as in FIG. 9A by using a gas pump 28 to recycle the exhaust gas 18 to the inlet 24 of the MABR unit 6, for example by connecting the exhaust gas line to a process air line or directly to membrane headers of the MABR unit 6. However, the process air recycle might be carried out in different ways depending on the source of oxygen. If air is used as the oxygen source, a continuous process air flow rate might be used with continuous exhaust recycle in a system as shown in FIG. 9A. If pure oxygen is used as the oxygen source, a batch feed of pure oxygen might be used with recycle as shown in the FIG. 9B. If an inert gas such as nitrogen is added to dilute the process air, an additional gas line and flow control are added.

FIGS. 10A, 10B and 10C show three alternative methods of process air cascade flow, which, generally speaking, is to run two or more MABR units 6 in series, using the exhaust air 18 of the first MABR unit as the feed air of the next MABR unit 6. In FIG. 10A, the outlet 26 of one MABR unit is connected to the inlet 24 of another MABR unit. The designations of inlets 24 and outlets 26 can be varied according to the reference direction of gas flow in an MABR unit. For example, while the gas flows downwards in both MABR units 6 in FIG. 10A, the gas could alternatively flow downwards in one MABR unit 6 and upwards in another MABR unit 6. Optionally, as shown in FIG. 10B, some of the exhaust air 18 can also be recycled to the inlet 24 of the first MABR, while another portion of the exhaust gas 18 flows to the next MABR unit 6. Optionally, the process air direction, through one or both of the MABR units 6 and/or the order of the MABR units, may be changed. As shown in FIG. 10C, the process air 15 flows in reverse order, and in a reverse direction, through the MABR units 6 relative to FIG. 10A. Process air cascade flow can be combined with any one or more of the other methods described herein. For example, process air cascade flow is combined with process air direction reversal by alternating between the configuration of FIG. 10A and the configuration of FIG. 10C in repeated cycles. The repeated cycles may be, for example, 0.5-10 days long or 1-7 days long.

Some strategies for quick startup include optimizing conditions and selection and pretreatment of seed sludges. Quantitative Polymerase Chain Reaction (qPCR) techniques can be used to identify and quantify the different anammox or other species in the seed sludge and in the biofilm. Seed sludge rich in fast growing anammox species, such as Ca. Brocadia Sinica, can shorten the startup time. In addition, a pretreatment of breaking up the seed sludge into small particles will enhance the initial attachment and therefore shorten the startup time as well.

In another process, off-site startup is used to speed up on-site startup in full-scale applications by providing a portion of pre-seeded MABR units, and in some cases, to eliminate the on-site startup by providing all pre-seeded MABR units.

Deammonification was performed in a lab scale pilot using synthetic wastewater of high-strength ammonium as the feed at temperature in the range of 30-35° C. Stable deammonification at optimized process air conditions (optimal process airflow and pressure) was achieved. Two strategies of quickly forming a single biofilm containing both ammonium oxidizing bacteria (AOB) and Anammox on ZeeLung membrane cords were tested and proved successful. The two strategies were (1) forming AOB in the biofilm first and then Anammox, and (2) forming Anammox in the biofilm first and then AOB. TIN removal was around 3.5 gN/m$^2$/d. TIN removal appears to be limited by the nitrite generation rate in the biofilm. To increase the nitrite generation rate, higher process airflow rates than the optimal continuous process airflow can be provided intermittently. Merely increasing the airflow rate from the optimal continuous airflow rate results in poor nitrification.

In cycles described herein the duration of a first period of time to the duration of a second period of time may be in the range of 1:4 to 4:1, or in the range of 1:2 to 2:1, or about 1:1.

Example 1

Figure 11A:
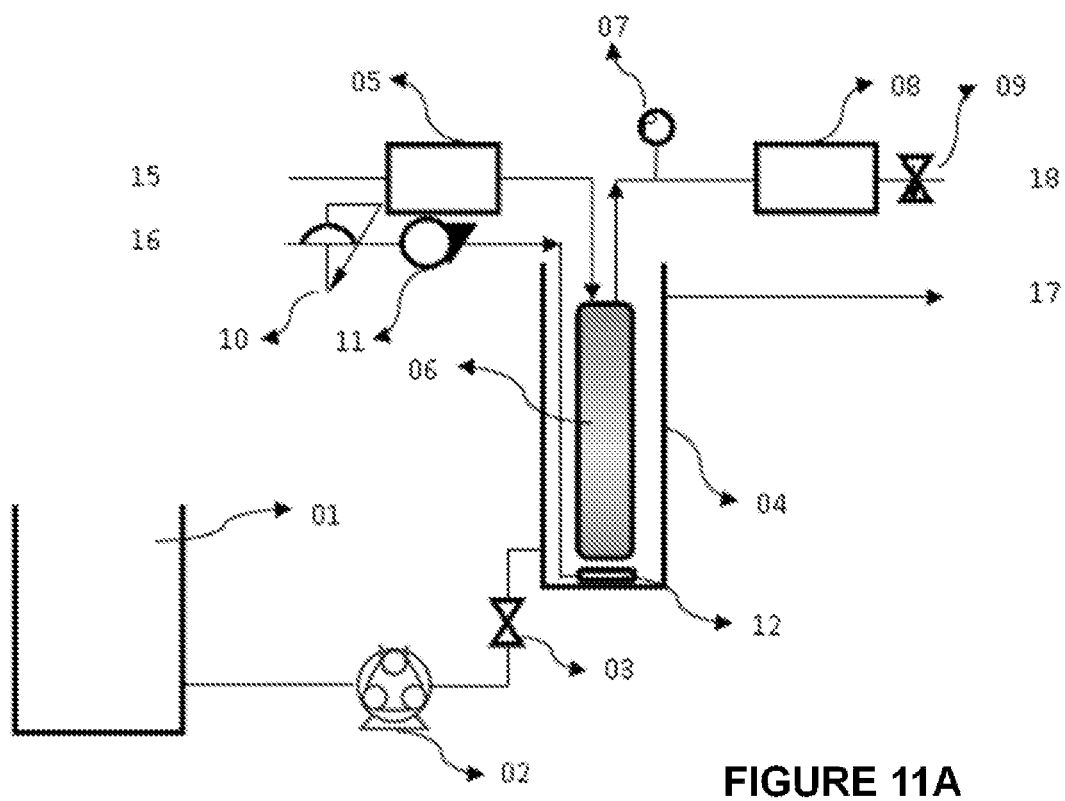
FIGS. 11A, 11B and 11C are schematic diagrams of an experimental MABR configured for start up, process air direction reversal and process air batch feed respectively.
Figure 11B:
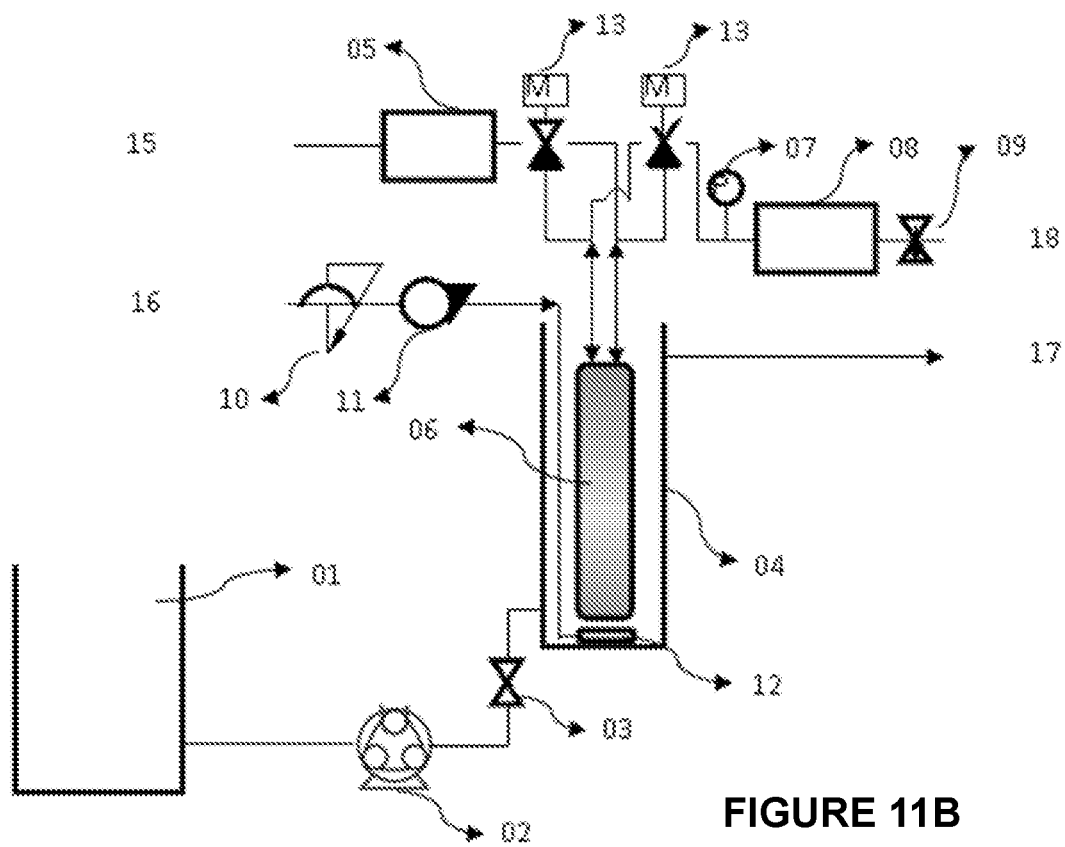
Figure 11C:
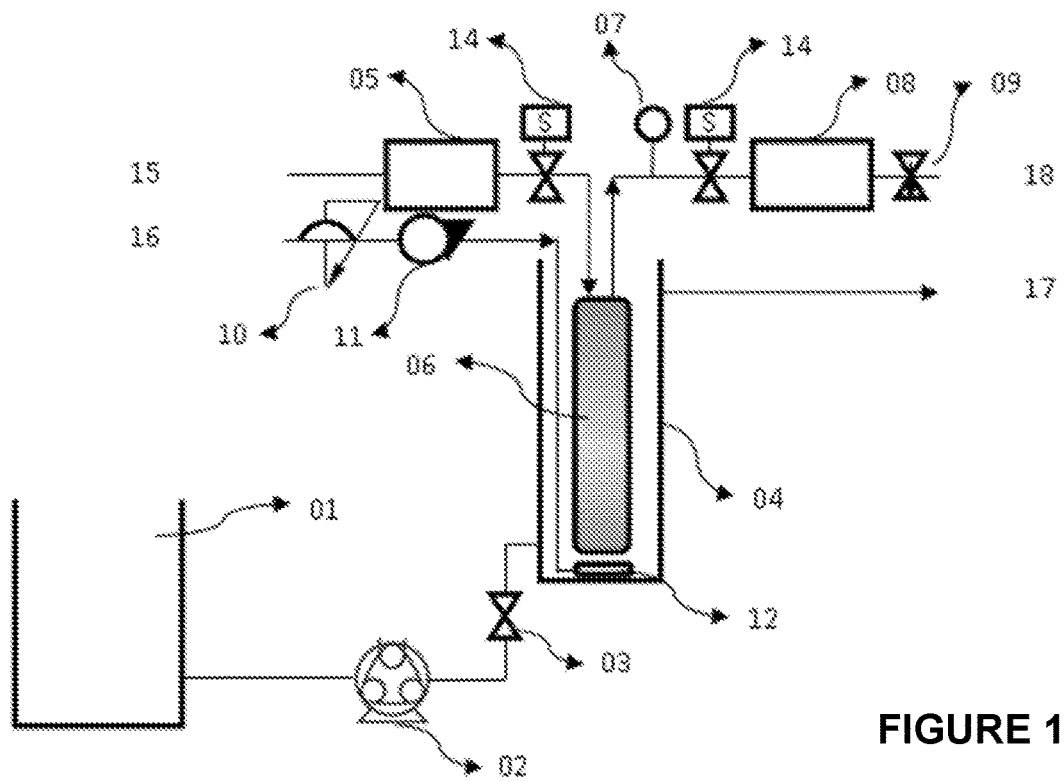

FIGS. 11A, 11B and 11C show a pilot scale membrane aerated biofilm reactor configured for operating in three different modes. In FIG. 11A, the reactor is configured to operate with a continuous supply of process air to an MABR. In FIG. 11B, the reactor is configured to operate with process air modulation and process air reversal. In FIG. 11C, the reactor is configured to provide an intermittent supply of process air.

Referring to FIG. 11A, wastewater is supplied from a feed tank 1 by a feed pump 2 through a valve 3 to an open tank 4. Feed water is treated in the tank 4 and leaves the tank as effluent 17. An MABR unit 6 is located in the tank 4 and kept submerged in feed water. In this example, the MABR unit 6 is a ZeeLung™ membrane module from Suez. Process air 15 is compressed and fed to the inlet of the MABR unit 6 through a mass flow controller 5. The process air flows from the inlet through the lumens of gas transfer membranes in the MABR unit 6 to an outlet of the MABR unit 6. As the process air passes through the MABR unit, oxygen passes through the gas transfer membranes to the feedwater to a biofilm on the outside of the gas transfer membranes. Process air flows from the outlet of the MABR unit 6 through a pressure gauge 7, a mass flow meter 8 and a needle valve 9 to be released as exhaust gas 18. The outside of the MABR unit 6 is scoured periodically with nitrogen bubbles to remove excess biofilm. To produce the bubbles, compressed nitrogen 16 is supplied through a pressure regulator 10 and a rotameter 11 to a coarse bubble aerator 13.

The reactor in FIG. 11B is similar to the reactor in FIG. 11A. The reference numbers in FIG. 11B refer to elements as described for FIG. 11A. In addition, the reactor in FIG. 11B has two three-way valves 13 and associated piping. The three-way valves can be configured to alternately (a) provide process air 15 to the inlet of the MABR unit 6 and release exhaust gas 18 from the outlet of the MABR unit 6 or b) provide process air 15 to the outlet of the MABR unit 6 and release exhaust gas 18 from the inlet of the MABR unit 6.

The reactor in FIG. 11C is similar to the reactor in FIG. 11A. The reference numbers in FIG. 11C refer to elements as described for FIG. 11A. In addition, the reactor in FIG. 11C has solenoid valves 14. The solenoid valves can be configured to alternately (a) provide process air to the inlet of the MABR unit 6 and release exhaust gas 18 from the outlet of the MABR unit 6 or b) seal the inlet and outlet of the MABR unit 6.

The reactor was started up in the configuration of FIG. 11A. Process air 15 was supplied to the MABR unit 6 continuously. Feed water was supplied to the tank 4 except while the reactor was seeded with a nitrifying sludge and an anammox sludge, as described below. The feedwater was a synthetic wastewater containing $NH_4$—N at a concentration of about 100 mgN/L and $NaHCO_3$. The feed water flow rate was adjusted to keep the $NH_4$—N concentration in the tank 4 above 50 mgN/L, except while the reactor was being seeded. The temperature of water in the tank 4 was 30 to 35° C. The pH of water in the tank 4 was above 6.7 and most of the time above 7.5. The continuous process airflow rate was 4.2 L/m$^2$/h (based on the area of gas transfer membranes in the MABR unit 6). Pressure in the MABR unit, as measured by pressure gage 7, was about 3 psi (21 kPa).

At the beginning of the process, nitrifying seed sludge from an activated sludge membrane bioreactor was added to the tank 4. After seeding, the mixed liquor suspended solids (MLSS) concentration in the reactor was about 3 g MLSS/L. The reactor was operated in batch mode for 10 days to keep the seed sludge in the tank 4. After 10 days of batch operation, the feed water pump 2 was started and the reactor was changed to a continuous feed and bleed operation. The suspended solids from the nitrifying seed sludge washed out of the reactor in a couple of days.

On the 46th day of operation, the flow of feed water was stopped and the tank 4 was seeded with an anammox sludge taken from a Demon™ granular sludge reactor. After seeding, the MLSS concentration in the reactor was around 3 g MLSS/L. The reactor was operated in batch mode for 30 days to keep the seed sludge in the tank 4. After 30 days of batch operation, the feed water pump 2 was started and the reactor was changed to a continuous flow through operation. The suspended solids from the nitrifying seed sludge washed out of the reactor in a couple of days.

Figure 12:
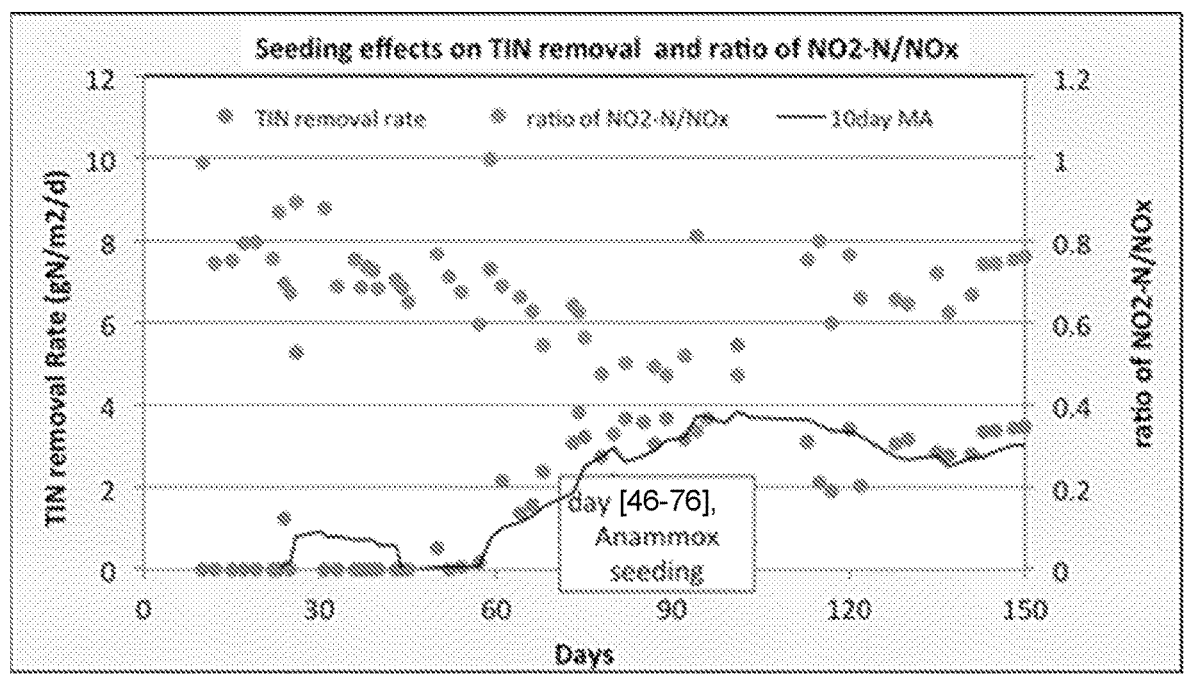
FIG. 12 is a graph of experimental results during operation of the MABR of FIG. 11A.

FIG. 12 shows results of operating the reactor for 150 days. the total inorganic nitrogen (TIN) removal rate began to increase after the seeding with anammox sludge on day 46. The results in FIG. 12 indicate that a partial nitritation/anammox (PN/A) biofilm was established in about 80 days with the sequential seeding of nitrifying seed sludge at day 0 followed by seeding with anammox sludge starting at day 46. Before seeding the reactor with anammox sludge, the TIN removal was approximately zero, which indicates that there was no anammox activity for nitrogen removal in the reactor. The TIN removal rate began increasing during the anammox sludge seeding period (days 46-76). TIN removal was stable after discharging the anammox seed sludge at about day 80.

A ratio of $NO_2$—N/NOx near 1.0 indicates that NOB are completely suppressed. A ratio of $NO_2$—N/NOx near 0 indicates that NOB are not suppressed. There was a decrease in the ratio of $NO_2$—N/NOx during the anammox seeding. However, the ratio of NO2-N/NOx recovered after the reactor returned to normal operation and the anammox sludge was discharged.

Figure 13:
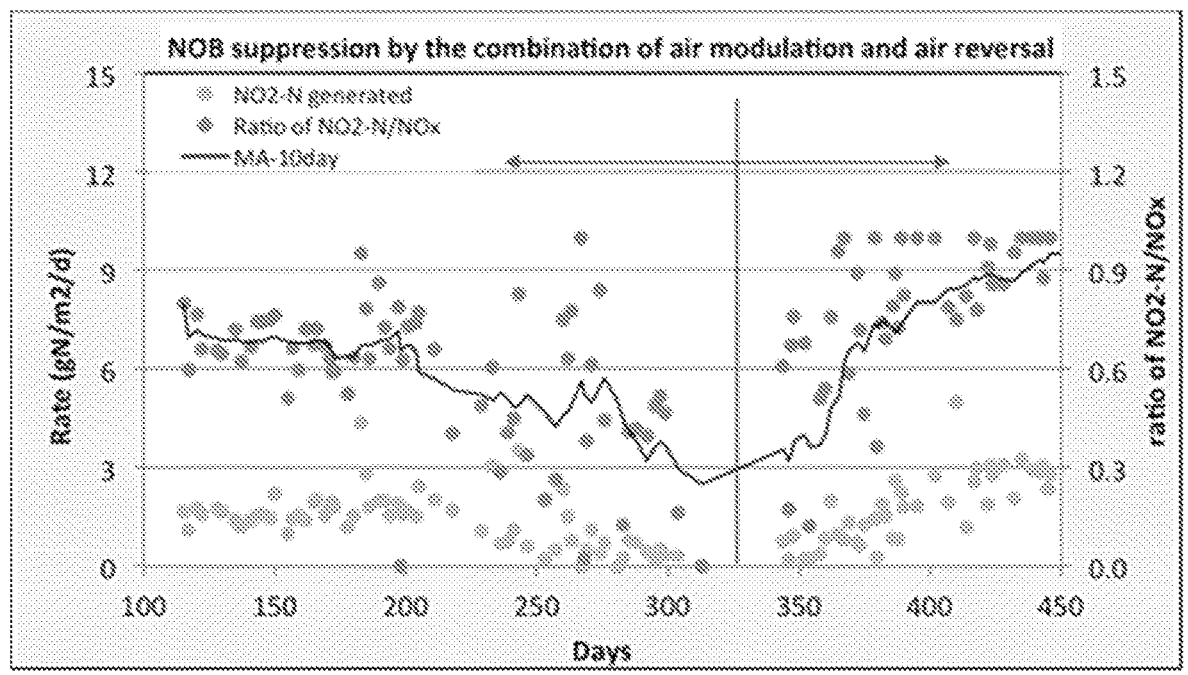
FIG. 13 is a graph of experimental results during operation of the MABR of FIG. 11B.

The reactor was operated for 450 days, including the 150 day period described above. Continuous process air was provided for about 325 days. The ratio of $NO_2$—N/NOx was about 0.7 for the first 200 days of operation but decline to about 0.3 on day 325 when process air modulation and process air reversal were both started. The reactor was configured as shown in FIG. 11B. According to process air modulation, process air was supplied at 3.2 $L/m^2/h$ for 3 days and then at 1.6 $L/m^2/h$ for 3 days, in repeated cycles. The direction of the process air flow was reversed once per day, i.e. the process air travelled from the inlet of the MABR 6 to the outlet of the MABR 6 for 1 day and then from the outlet to the inlet for 1 day, in repeated cycles. Referring to FIG. 13, the ratio of $NO_2$—N/NOx began to increase when process air modulation and process air direction reversal were introduced. The ratio of $NO_2$—N/NOx was over 0.9 by day 450. $NO_2$—N generation also increased when process air modulation and process air direction reversal were introduced.

Figure 14:
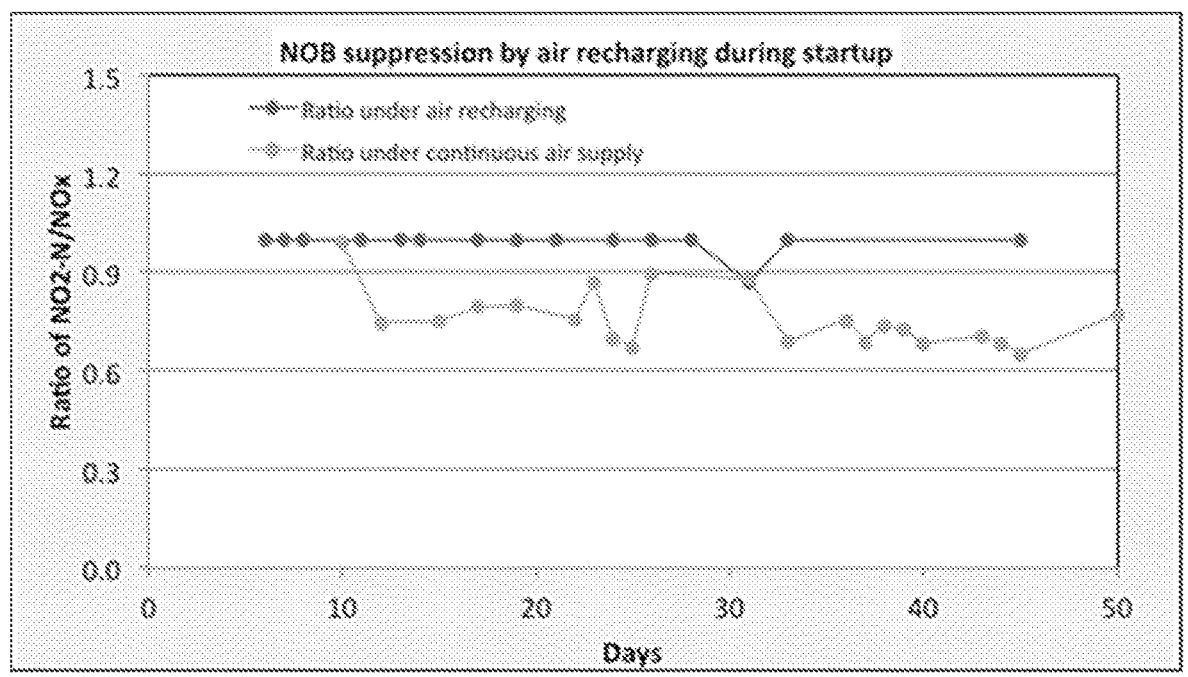
FIG. 14 is a graph of experimental results during operation of the MABR of FIG. 11C.

A second reactor was set up and operated as described for the reactor except that the reactor was configured as shown in FIG. 11C. In addition, during the start up of this reactor, process air was provided in batches instead of continuously. In particular, process air was provided at 13.2 $L/m^2/h$ for 8 minutes, and then the solenoid valves 14 were closed to hold the pressurized process air inside the MABR module for 10 minutes, in repeated cycles. FIG. 14 compares the $NO_2$—N/NOx ratio during startup between the second reactor with process air supplied in batches and the first reactor with process air supplied continuously. NOB were almost completely suppressed during startup with process air provided in batches while there was some NOB in the biofilm when continuous air was supplied during startup.

Example 2

A pilot scale MABR reactor was operated and fed with lagoon supernatant from an anaerobic digestion process. The reactor had three ZeeLung™ MABR units in a single reactor tank. The reactor tank was fed the lagoon supernatant at a constant rate. Each MABR unit had independent process air control, allowing for different airflow conditions in each MABR unit. Each MABR unit had exhaust gas monitoring for oxygen concentration. The reactor temperature was maintained using a recirculation loop and inline heater. The process was started up by seeding the reactor with 3 g/L of nitrifying MLSS, which was diluted out of the system after five days. After the initial seeding, the pilot reactor was operated in a flow-through configuration.

The reactor had configuration and operating conditions as described in Table 1. MABR unit 1 was operated with process air direction reversal every 24 hours. MABR unit 2 was operated with process air direction reversal every 48 hours. MABR unit 3 was operated without process air direction reversal. The exhaust gas oxygen concentration was measured as an indicator of biofilm growth. In particular a low, for example 2% or less, exhaust gas oxygen concentration, indicates stable partial nitritation and out-selection of nitrite oxidizing bacteria (NOB).

TABLE 1

| Parameter | Value | Units |
| --- | --- | --- |
| Number of MABR Units | 3 | # |
| Surface Area Per MABR Unit | 40 | $m^2$ |
| Total Membrane Surface Area | 120 | $m^2$ |
| Feed Flow Rate | 50 | L/h |
| Influent Ammonia Concentration | 900 | mg/L |
| Process Air Flow Rate | 1.35 | $L/m^2/h$ |
| Inlet gas pressure | 45 | kPa |
| Exhaust gas pressure | 20 | kPa |
| MABR 1 air reversal frequency | 24 | Hours |
| MABR 2 air reversal frequency | 48 | Hours |
| MABR 3 air reversal frequency | N/A | Hours |
| Reactor Temperature | 30 | ° C. |

Figure 15:
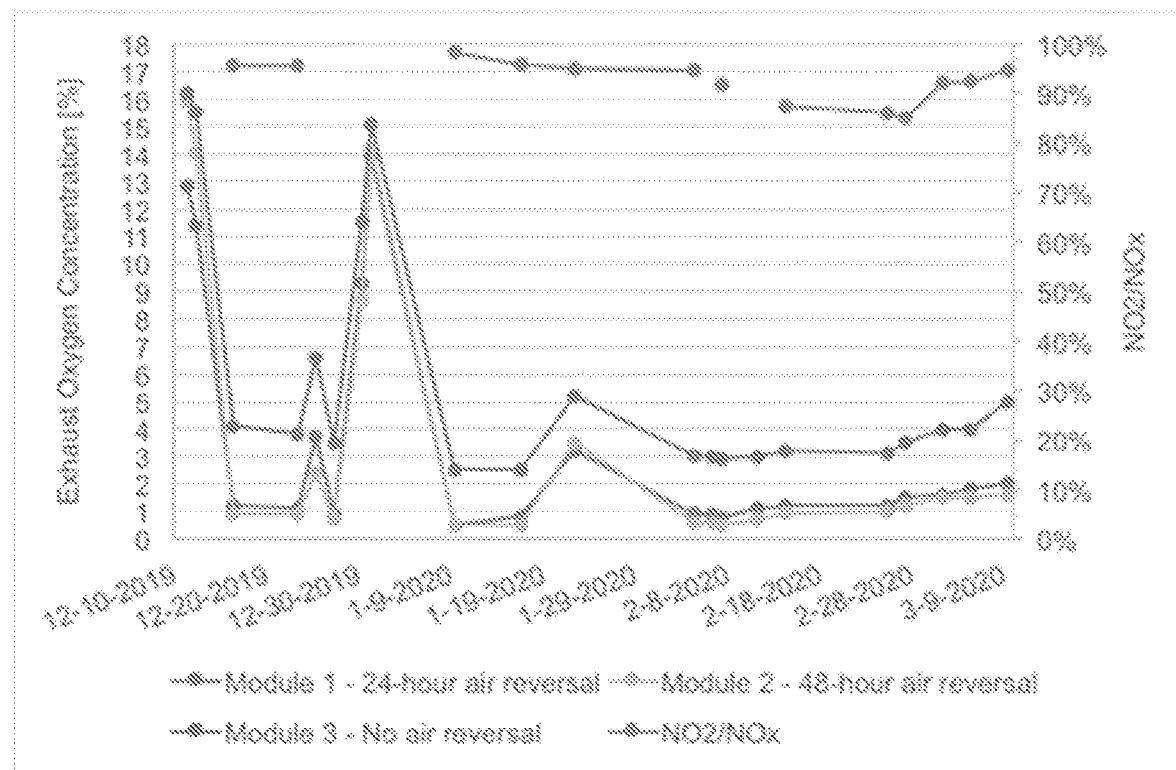
FIG. 15 is a graph of experimental results of an MABR with process air modulation and, in some cases, process air direction reversal.

FIG. 15 shows the exhaust oxygen concentration from each of the three MABR units along with the ratio of nitrite produced to total NOx produced for the entire reactor. MABR units 1 and 2 achieved low exhaust oxygen concentration the fastest and most consistently. MABR unit 3 did not achieve as low exhaust oxygen concentration. These results demonstrate that air reversal achieves lower exhaust oxygen concentration for a given airflow, indicating a more effective NOB suppression with process air direction reversal. The reactor achieved a nitrate to NOx ratio over 0.85, also indicating effective NOB suppression.

Example 3

Figure 16:
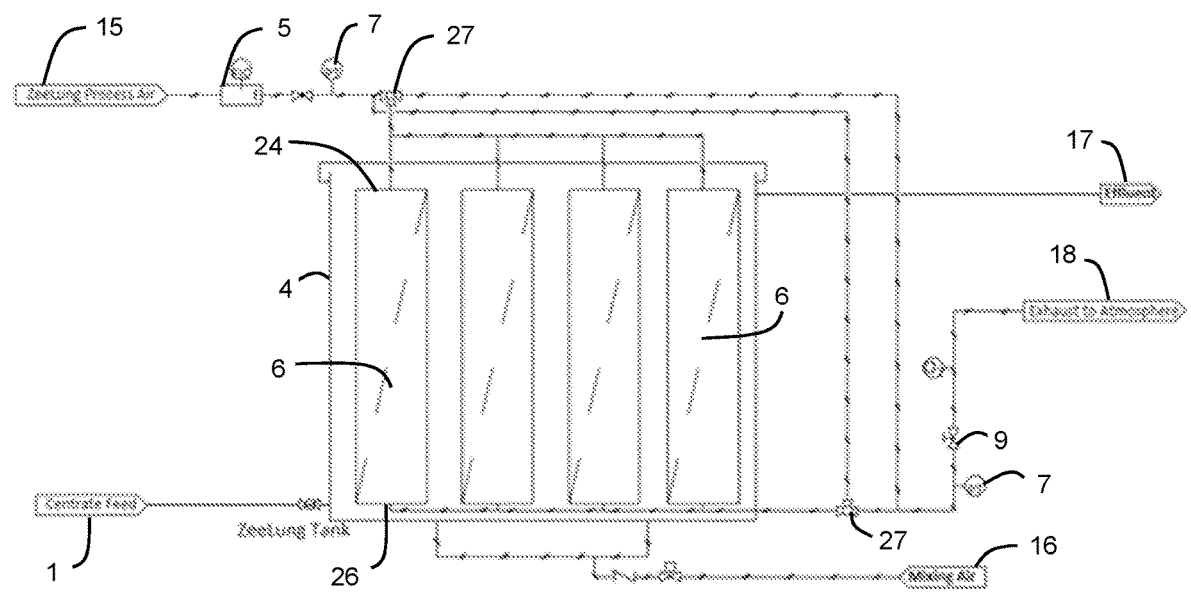
FIG. 16 shows an experimental MABR with process air direction reversal.

A lab scale MABR reactor was operated to treat high strength centrate from the dewatering of anaerobic digestion sludge at a municipal wastewater treatment plant. The reactor consisted of four lab scale MABR units 6 in a single tank 4. The lab scale MABR units 6 are 0.5 m long (measured as the length of membrane between the headers that is exposed to water). In contrast, a ZeeLung™ MABR unit is 2.0 m long. The tank 4 was temperature controlled using an electric heating blanket. The centrate (feed water 1)

was pumped into the tank 4 on a continuous basis. An initial configuration had the four MABR units 6 configured in parallel as shown in FIG. 16. Process air direction reversal was applied every 24-hours (i.e. a 2 day total cycle time) by changing the positions of three-way valves 27. The reactor was initially seeded with 3 g/L of nitrifying MLSS, which was then purged out of the system after 3 days.

Figure 17:
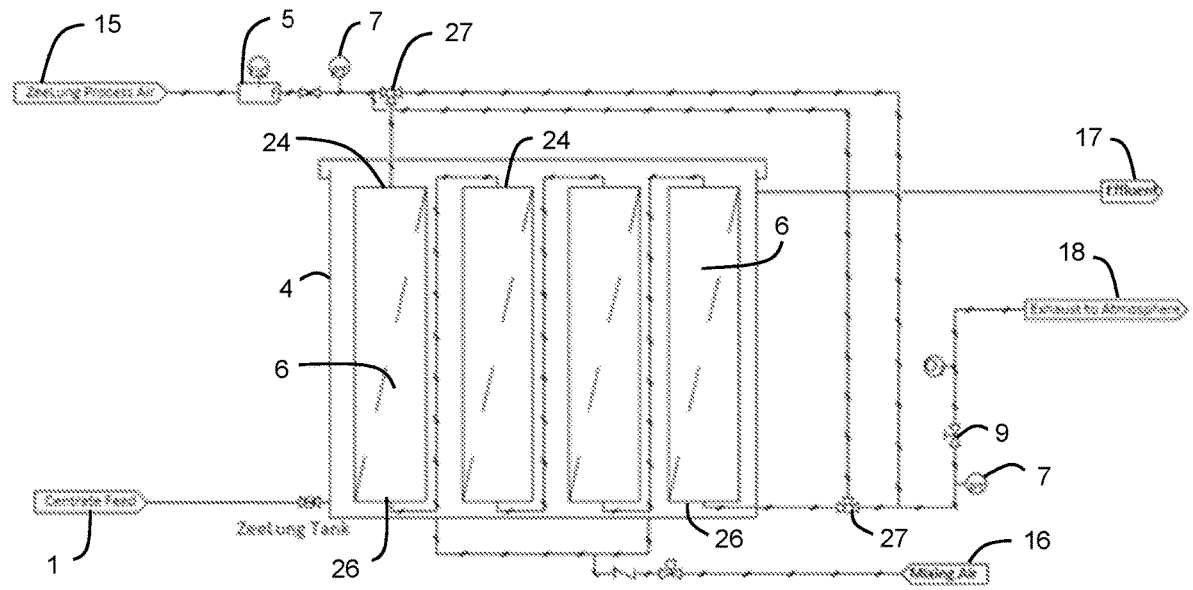
FIG. 17 shows the experimental MABR of FIG. 16 configured with process air direction reversal and process air cascade flow.

After three months of operation, the reactor was reconfigured as shown in FIG. 17 such that the MABR units 6 operated with process air cascade flow (i.e. process air flow in series). The MABR units 6 were connected in series with the outlet 26 of one MARB unit 6 connected to the inlet 24 of the next MABR unit 6. Process air direction reversal was also applied every 24 hours (2 day total cycle time) by changing the positions of three-way valves 27. Operating conditions for the reactor are summarized in Table 2.

TABLE 2

| Parameter | Value | Units |
| --- | --- | --- |
| Number of MABR units | 4 | # |
| Surface Area Per MABR unit | 0.25 | $m^2$ |
| Total Membrane Surface Area | 1 | $m^2$ |
| Centrate Flow Rate | 0.5 | L/h |
| Influent Ammonia Concentration | 750 | mg/L |
| Process Air Flow Rate | 0.5 | $L/m^2/h$ |
| Inlet gas pressure | 45-55 | kPa |
| Exhaust gas pressure | 25-50 | kPa |
| Air reversal frequency | 24 | hours |
| Reactor Temperature | 34 | ° C. |

Figure 18:
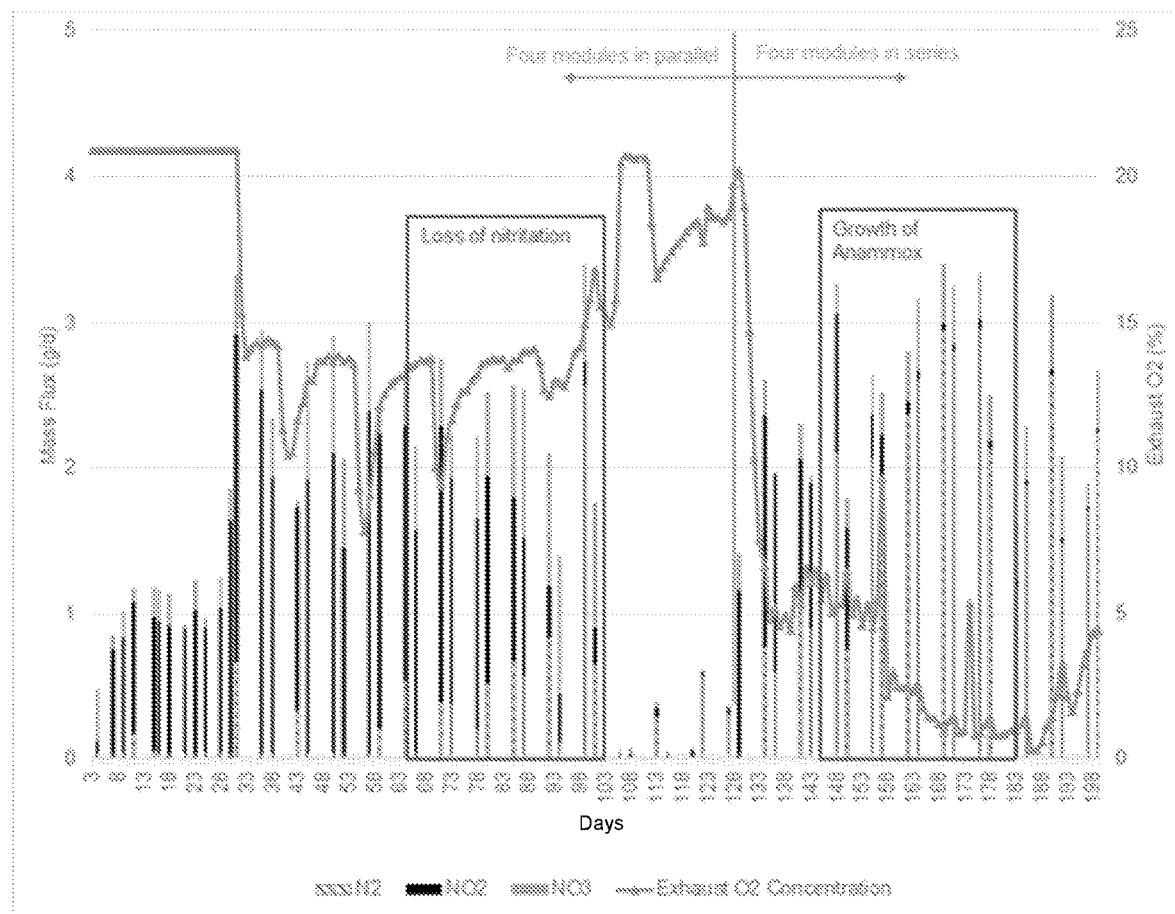
FIG. 18 is a graph of experimental results for the MABR of FIGS. 16 and 17.

FIG. 18 shows the nitrogen species generated as a result of ammonia conversion along with the exhaust oxygen concentration from the MABR units. While the four MABR units received oxygen in parallel, a high exhaust oxygen concentration was observed. Initially, the reactor had good nitritation, as shown in FIG. 18 by the large proportion of nitrite produced during the first two months of operation. Loss of nitritation, and a conversion full nitrification, occurred at about 2 months as shown in FIG. 18 by the increasing proportion of nitrate produced and decreasing proportion of nitrite produced. Reconfiguring the four MABR units in series, resulting in a longer effective membrane length, resulted in a reduced exhaust oxygen concentration, recovery of nitritation and subsequent growth of anammox. Growth of anammox was indicated by an increasing portion of ammonia converted to nitrogen gas, indicating nitritation by AOB and conversion of ammonia and nitrite by anammox.

The combination of MABR units operated in series, low exhaust oxygen concentration, and air flow direction reversal led to the indigenous growth of anammox bacteria, indicating that the NOB population was controlled and appropriate conditions for growth of anammox were provided.

Example 4

A pilot plant was operated to treat high strength centrate from the dewatering of anaerobic digestion sludge at a municipal wastewater treatment plant. The pilot plant consisted of three ZeeLung™ MABR units in a single reactor tank and was fed centrate at a constant rate. The MABR units had a common process air feed and exhaust and the process air was distributed evenly between the three modules. The reactor temperature was maintained using a recirculation loop and inline heater. The process was started up by seeding the reactor with 3 g/L of nitrifying MLSS, which was diluted out of the system after five days. After the initial seeding, the pilot was operated in flow-through configuration The pilot reactor was reconfigured to test the effects of process air direction reversal and process air nitrogen enrichment. During process air nitrogen enrichment, a dilution stream of nitrogen gas was added to the process air before feeding the nitrogen enriched process air to the MABR units. The gas flows were arranged such that the MABR units had the same oxygen mass flow but a lower oxygen concentration where the process air enters the lumens of the gas transfer membranes. The reactor was operated under the conditions shown in Table 3.

TABLE 3

| Parameter | Value | Units |
| --- | --- | --- |
| Number of MABR Units | 3 | # |
| Surface Area Per MABR Unit | 40 | $m^2$ |
| Total Membrane Surface Area | 120 | $m^2$ |
| Centrate Flow Rate | 40-50 | L/h |
| Influent Ammonia Concentration | 500-700 | mg/L |
| Air Flow Rate | 1.6 | $L/m^2/h$ |
| Process gas dilution flow rate (when applied) | 1.6 | $L/m^2/h$ |
| Inlet gas pressure | 40 | kPa |
| Exhaust gas pressure | 28 | kPa |
| Air reversal frequency | 24 | hours |
| Reactor Temperature | 31 | ° C. |

Figure 19:
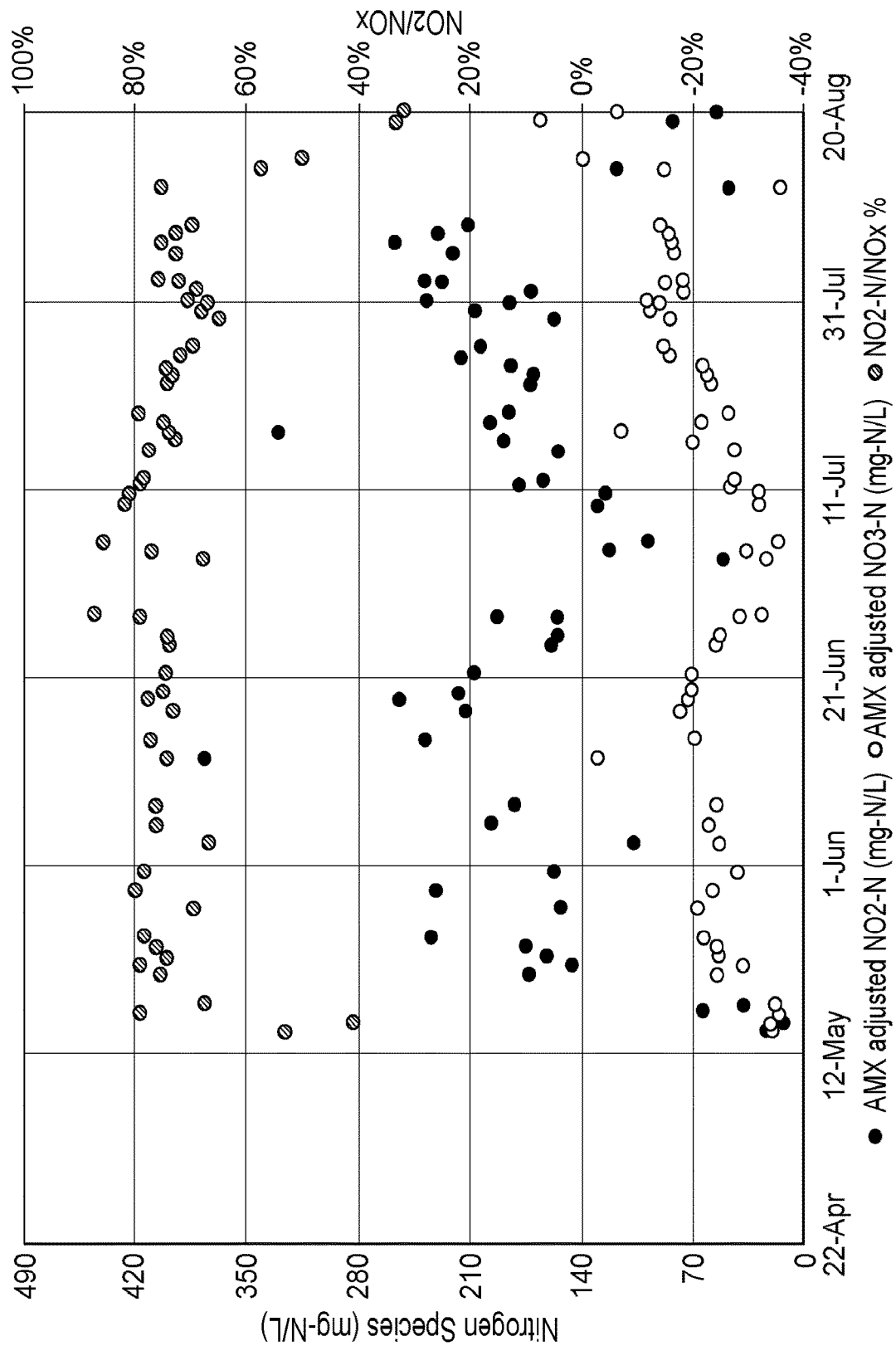
FIG. 19 is a graph of experimental results during the start up of another MABR.

After seeding, the reactor was run in a feed water flow through mode. The MABR units were initially operated by introducing process air at the top of the MABR units and collecting exhaust from the bottom of the MABR units. Nitritation was stable throughout the first 60 days of operation without nitrate accumulation. However, over time NOB acclimated to the process conditions and nitrate accumulation occurred. As shown in FIG. 19, nitrate accumulation started around day 80 and continues to around day 120. During this stretch of time the nitrate concentrations exceeded 100 mgN/L.

Beginning on day 120, air flow direction reversal was implemented. In the reverse direction, process air was fed to the bottom of the MABR unit and exhausted from the top of the MABR unit. The process air flow direction was reversed every 24 hours. Up to day 120, the exhaust oxygen concentration was <2%, meaning that the bacteria at the bottom of the MABR unit where receiving oxygen transfer from a gas with an oxygen concentration less than 2%. It is likely that the ecology at the bottom of the MABR units was conditioned to out-select NOB's, which are sensitive to anoxia, due to the low oxygen concentration while the AOB's could consume the limited oxygen to oxidize ammonia.

When the process air direction was reversed and air with 20.9% oxygen was introduced to the bottom of MABR unit, nitrate production from the MABR unit decreased immediately, but slowly re-accumulated over time. With the airflow direction switched, the top of the module sees low oxygen concentration, creating NOB limiting conditions. The strategy, then, is to leverage the periods of anoxia at the top versus bottom of the module as a way of avoiding NOB activity and, in turn, nitrate accumulation.

Figure 20:
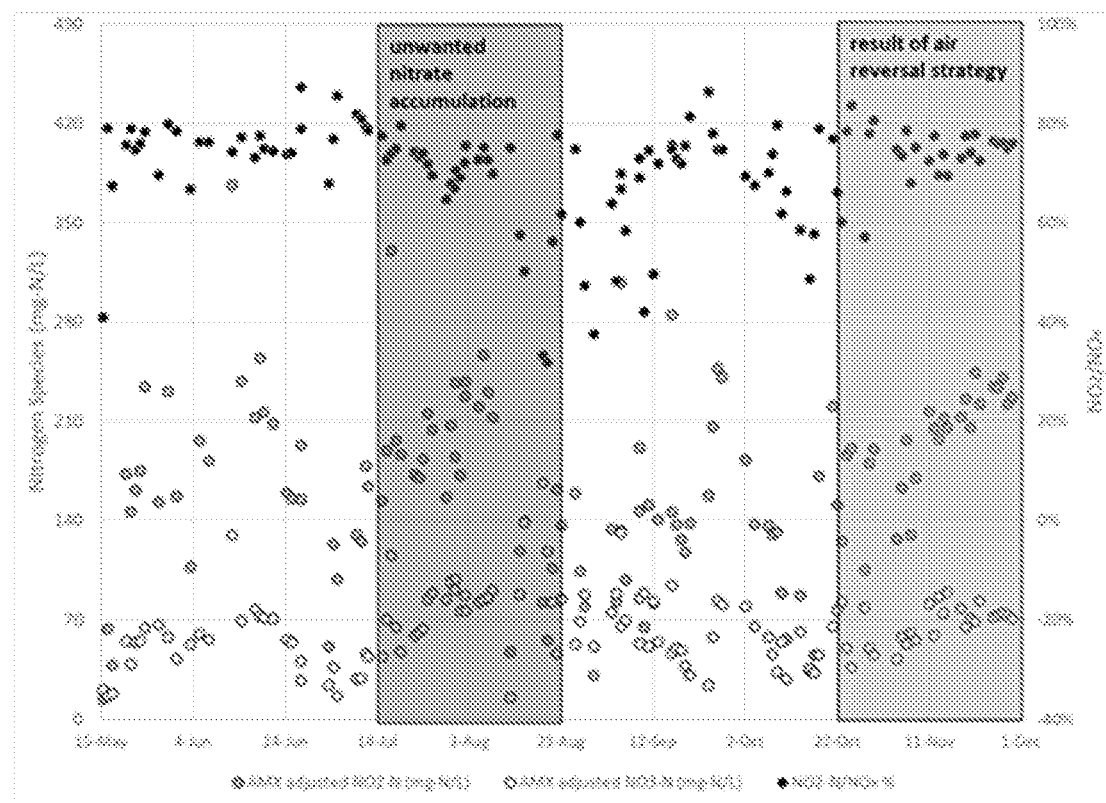
FIG. 20 is a graph of experimental results of the MABR of FIG. 19 including a period of process air direction reversal.

FIG. 20 shows the impact of reversing the process air direction on a regular basis (i.e. every 24 hours). In the period between July 14 and August 23, nitrite concentrations reached 250 mgN/L but nitrate reached concentrations greater than 100 mgN/L. August 23 to October was a transitional period in which process air direction reversal was implemented intermittently. Continuous operation with process air direction reversal occurred between October 22 and December 1. During this period, nitrite concentrations again reached 250 mg-N/L, but nitrate concentrations leveled off and were maintained around 70 mgN/L.

Figure 21:
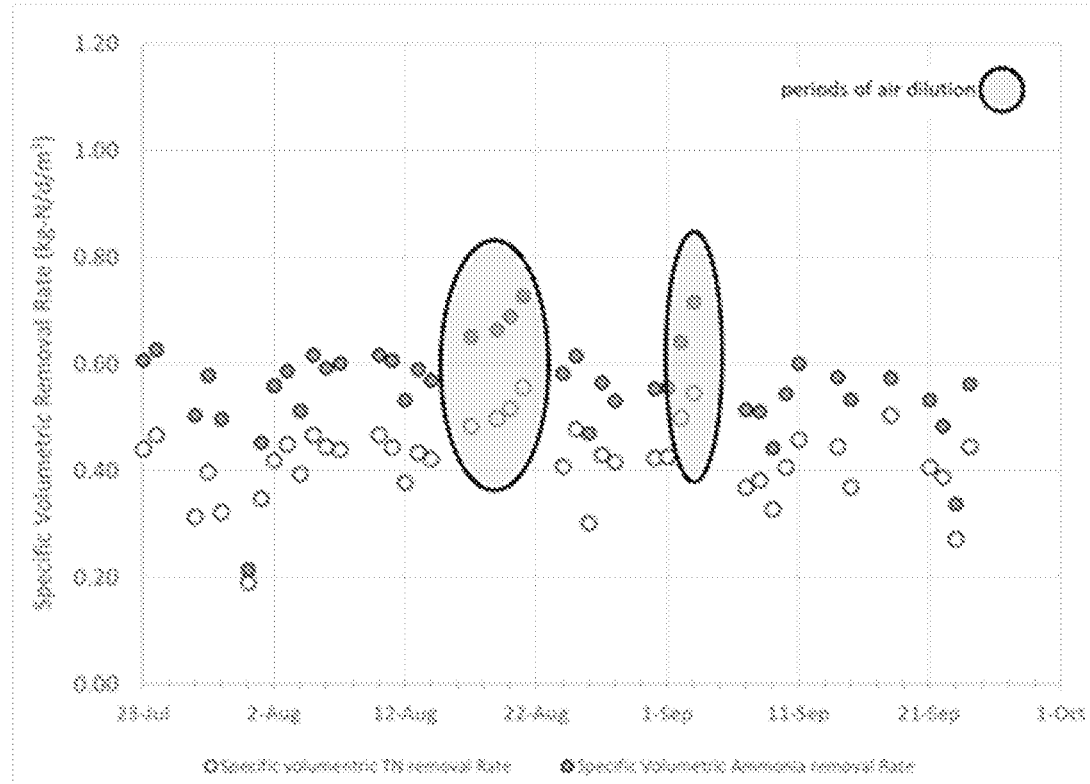
FIG. 21 is a graph of experimental results of the MABR of FIG. 19 including a period of process air nitrogen enrichment.

Referring to FIG. 21, between August 14 and September 2, the pilot was reconfigured to test the effect of process air nitrogen enrichment. There was no process air direction reversal during the process air nitrogen enrichment. There were two tests of process air nitrogen enrichment in the periods highlighted in FIG. 21. The air dilution tests resulted in high ammonia and nitrogen removal rates. The $90^{th}$ percentile of performance data for ammonia and nitrogen removal rates between day 90 and day 110 and were 0.62 kg/d/m$^3$ and 0.47 kg-N/d/m$^3$, respectively. During the first period of dilution, the $25^{th}$ percentile for ammonia and nitrogen removal rates were 0.65 kg-N/d/m$^3$ and 0.45 kg-N/d/m$^3$, respectively, demonstrating that the removal rates were much higher than the $90^{th}$ percentile removal rates for the period without air dilution. The performance during the periods of air dilution showed a material change in performance of the reactor in ammonia and nitrogen removal, which was reversed when the dilution was removed. A second shorter period of process air dilution showed the same trend.

We claim:

1. A process comprising steps of,
   immersing an apparatus comprising a membrane aerated biofilm media (an "MABR unit") in water comprising ammonia;
   providing a gas comprising oxygen ("process air") to the inside of the MABR unit; and,
   growing a population of bacteria on the outside of the MABR unit wherein the bacteria include ammonia oxidizing bacteria (AOB),
   wherein the process comprises process air direction reversal wherein process air flows in one direction through the MABR unit for a first period of time, and then flows in the opposite direction through the MABR unit for a second period of time.

2. The process of claim 1 further comprising batch feed of process air in a cycle wherein air is provided to the MABR unit for a third period of time and then valves are closed upstream and downstream of the MABR unit for a fourth period of time.

3. The process of claim 2 wherein a total cycle time of the batch feed of process air is between 0.1 and 2 hours.

4. The process of claim 1 further comprising process air modulation wherein process air is provided to the MABR unit at a first rate for a third period of time and at a second rate for a fourth period of time.

5. The process of claim 4 wherein a total cycle time of the process air modulation is between 0.5 and 10 days.

6. The process of claim 1 wherein a total cycle time of the process air direction reversal is between 0.5 and 10 days.

7. The process of claim 1 further comprising process air cascade flow.

8. The process of claim 1 wherein MABR exhaust has an oxygen concentration of 4% or less.

9. The process of claim 1 further comprising one or more of: process air cascade flow; process air batch feed; process air modulation; and, process air nitrogen enrichment.

10. A process comprising steps of,
    immersing an apparatus comprising a membrane aerated biofilm media (an "MABR unit") in water comprising ammonia;
    providing a gas comprising oxygen ("process air") to the inside of the MABR unit; and,
    growing a population of bacteria on the outside of the MABR unit wherein the bacteria include ammonia oxidizing bacteria (AOB); and,
    process air nitrogen enrichment wherein nitrogen enriched air is provided to the MABR unit, wherein the nitrogen enriched air is provided by process air recycle, comprising flowing at least some exhaust gas from an outlet of the MABR unit into an inlet of the MABR unit.

11. The process of claim 10 wherein a first process air is provided to the MABR unit for a first period of time and a second, relatively nitrogen enriched, process air is provided to the MABR for a second period of time.

12. The process of claim 11 wherein the first process air is ambient air.

13. The process of claim 11 wherein a total cycle time of the first process air is between 0.5 and 10 days.

14. The process of claim 10 further comprising process air cascade flow between a plurality of MABR units, wherein process air is provided to the plurality of MABR units in series by connecting a port of one MABR unit to a port of another MABR unit.

15. The process of claim 14 wherein each MABR unit is less than 0.5 m long, or wherein the MABR units in series are more than 1 m long.

16. The process of claim 10 further comprising process air direction reversal.

17. The process of claim 16 wherein MABR exhaust has an oxygen concentration of 2% or less.

18. The process of claim 10 further comprising one or more of: process air cascade flow; process air batch feed; process air modulation; and, process air direction reversal.

19. A process comprising steps of,
    immersing an apparatus comprising a membrane aerated biofilm media (an "MABR unit") in water comprising ammonia;
    providing a gas comprising oxygen ("process air") to the inside of the MABR unit; and,
    growing a population of bacteria on the outside of the MABR unit wherein the bacteria include ammonia oxidizing bacteria (AOB); and,
    process air nitrogen enrichment wherein nitrogen enriched air is provided to the MABR unit, wherein a first process air is provided to the MABR unit for a first period of time and a second, relatively nitrogen enriched, process air is provided to the MABR for a second period of time and wherein the second process air flow rate is higher than the first process air flow rate.

20. An MABR comprising an MABR unit and one or more of: conduit networks; gages; valves; sensors; and, flow control devices, configured for providing process air to the MABR unit according to the process of claim 1.

* * * * *